United States Patent
Yamamoto et al.

(10) Patent No.: US 6,476,515 B1
(45) Date of Patent: Nov. 5, 2002

(54) VEHICLE ELECTRIC CONTROL SYSTEM WITH INPUT DEVICE CONNECTED TO CENTRAL AND PERIPHERAL CONTROL DEVICES FOR CONTROLLING ACTUATOR

(75) Inventors: Takayuki Yamamoto, Aichi-gun (JP); Satoru Niwa, Susono (JP); Naoki Sawada, Anjo (JP); Hiroaki Aizawa, Kariya (JP); Seiichi Kojima, Niwa-gun (JP)

(73) Assignees: Toyota Jidosha Kabushiki Kaisha, Toyota (JP); Denso Corporation, Kariya (JP); Aisin Seiki Kabushiki Kaisha, Kariya (JP)

( * ) Notice: Subject to any disclaimer, the term of this patent is extended or adjusted under 35 U.S.C. 154(b) by 74 days.

(21) Appl. No.: 09/639,009

(22) Filed: Aug. 15, 2000

(30) Foreign Application Priority Data

Sep. 2, 1999 (JP) ............................................ 11-248874
Dec. 9, 1999 (JP) ............................................ 11-350263

(51) Int. Cl.[7] ................................................ B60L 1/00
(52) U.S. Cl. ........................... 307/10.1; 307/9.1; 303/9; 303/122.02
(58) Field of Search ................................. 307/10.1, 9.1; 303/9, 9.61, 122.01, 122.02, 122.03, 122.04, 122.05, 122.06, 20; 701/70

(56) References Cited

FOREIGN PATENT DOCUMENTS

| JP | 10 76925 | 3/1998 |
| JP | 27 91964 | 6/1998 |
| JP | 28 35173 | 10/1998 |
| JP | 11 502169 | 2/1999 |

*Primary Examiner*—Stephen W. Jackson
*Assistant Examiner*—Robert L Deberadinis
(74) *Attorney, Agent, or Firm*—Kenyon & Kenyon

(57) ABSTRACT

An electric control system for an automotive vehicle, including a peripheral control device for electrically controlling an actuator device, a central control device connected to the peripheral control device, and an input device, wherein the central control device and the peripheral control device cooperate with each other to control the actuator device on the basis of an output of the input device. The input device is connected to both of the central control device and the peripheral control device.

21 Claims, 14 Drawing Sheets

FIG. 4

□ NORMAL BRAKE  ☒ DEFECTIVE BRAKE  ■ OPERATION-INHIBITED BRAKE

| STATES OF CONTROL DEVICES ○:NORMAL ×:DEFECTIVE | | | | | CONTROL MODES | | OPERATING STATES | | | | | DECELERATION |
|---|---|---|---|---|---|---|---|---|---|---|---|---|
| | CENTRAL ECU | MOTOR ECUs | | | | WHEEL BRAKING STATES | CENTRAL ECU | MOTOR ECUs | | | | |
| | | FL | FR | RL | RR | | | | FL | FR | RL | RR | |
| NORMAL | ○ | ○ | ○ | ○ | ○ | NOMAL CONTROL | □-□ □-□ | A-1 | B-1 | B-1 | B-1 | B-1 | NORMAL BRAKING |
| ONE DEFECTIVE CONTROL DEVICE | × | ○ | ○ | ○ | ○ | INDEPENDENT CONTROL | □-□ □-□ | — | B-2 | B-2 | B-2 | B-2 | NORMAL BRAKING |
| | ○ | × | ○ | ○ | ○ | DIAGONAL CONTROL | ☒-□ □-☒ | A-2 | — | B-1 | B-1 | B-5 | 0.5G |
| | ○ | ○ | × | ○ | ○ | DIAGONAL CONTROL | □-☒ ■-□ | A-2 | B-1 | — | B-5 | B-1 | 0.5G |
| | ○ | ○ | ○ | × | ○ | 3-WHEEL CONTROL | □-□ ☒-□ | A-2 | B-1 | B-1 | — | B-1 | 0.85G |
| | ○ | ○ | ○ | ○ | × | 3-WHEEL CONTROL | □-□ □-☒ | A-2 | B-1 | B-1 | B-1 | — | 0.85G |

FIG. 5

□ NORMAL BRAKE   ⊠ DEFECTIVE BRAKE   ■ OPERATION-INHIBITED BRAKE   ☒ OPERATION-RESTRICTED BRAKE

| STATES OF CONTROL DEVICES ○:NORMAL ×:DEFECTIVE | | | | | CONTROL MODES | | OPERATING STATES | | | | | DECELERATION |
|---|---|---|---|---|---|---|---|---|---|---|---|---|
| CENTRAL ECU | MOTOR ECUs | | | | | WHEEL BRAKING STATES | CENTRAL ECU | MOTOR ECUs | | | | |
| | FL | FR | RL | RR | | | | FL | FR | RL | RR | |
| × | × | ○ | ○ | ○ | DIAGONAL CONTROL | ⊠□ / □□ | — | — | B-2 | B-2 | B-6 | 0.5G |
| × | ○ | × | ○ | ○ | DIAGONAL CONTROL | □⊠ / □□ | — | B-2 | — | B-6 | B-2 | 0.5G |
| × | ○ | ○ | × | ○ | 3-WHEEL CONTROL | □□ / ⊠□ | — | B-2 | B-2 | — | B-2 | 0.85G |
| × | ○ | ○ | ○ | × | 3-WHEEL CONTROL | □□ / □⊠ | — | B-2 | B-2 | B-2 | — | 0.85G |
| ○ | × | × | ○ | ○ | 2-REAR-WHEEL CONTROL | ⊠⊠ / □□ | A-2 | — | — | B-1 | B-1 | 0.3G |
| ○ | × | ○ | × | ○ | RESTRICTED 1-WHEEL CONTROL | ⊠□ / ⊠□ | A-3 | — | B-3 | — | B-5 | 0.3G |
| ○ | × | ○ | ○ | × | DIAGONAL CONTROL | ⊠□ / □■ | A-2 | — | B-1 | B-1 | — | 0.5G |
| ○ | ○ | × | × | ○ | DIAGONAL CONTROL | □⊠ / ⊠□ | A-2 | B-1 | — | — | B-1 | 0.5G |
| ○ | ○ | × | ○ | × | RESTRICTED 1-WHEEL CONTROL | □⊠ / □⊠ | A-3 | B-3 | — | B-5 | — | 0.3G |
| ○ | ○ | ○ | × | × | 2-FRONT-WHEEL CONTROL | □□ / ⊠⊠ | A-2 | B-1 | B-1 | — | — | 0.7G |

TWO DEFECTIVE CONTROL DEVICE

FIG. 6

□ NORMAL BRAKE　　☒ DEFECTIVE BRAKE　　■ OPERATION-INHIBITED BRAKE　　☲ OPERATION-RESTRICTED BRAKE

| STATES OF CONTROL DEVICES ○:NORMAL ×:DEFECTIVE | | | | | CONTROL MODES | | OPERATING STATES | | | | | DECELERATION |
|---|---|---|---|---|---|---|---|---|---|---|---|---|
| CENTRAL ECU | MOTOR ECUs | | | | | WHEEL BRAKING STATES | CENTRAL ECU | MOTOR ECUs | | | | |
| | FL | FR | RL | RR | | | | FL | FR | RL | RR | |
| × | × | × | ○ | ○ | 2-REAR-WHEEL CONTROL | ☒-□<br>□-☒ | — | — | — | B-2 | B-2 | 0.3G |
| × | × | ○ | × | ○ | RESTRICTED 1-WHEEL CONTROL | ☒-■<br>☒-☒ | — | — | B-4 | — | B-6 | 0.3G |
| × | × | ○ | ○ | × | DIAGONAL CONTROL | ☒-□<br>□-☒ | — | — | B-2 | B-2 | — | 0.5G |
| × | ○ | × | × | ○ | DIAGONAL CONTROL | □-☒<br>☒-□ | — | B-2 | — | — | B-2 | 0.5G |
| × | ○ | × | ○ | × | RESTRICTED 1-WHEEL CONTROL | ■-☒<br>☒-■ | — | B-4 | — | B-6 | — | 0.3G |
| × | ○ | ○ | × | × | 2-FRONT-WHEEL CONTROL | □-□<br>☒-☒ | — | B-2 | B-2 | — | — | 0.7G |
| ○ | × | × | × | ○ | × | ☒-☒<br>☒-□ | A-2 | — | — | — | B-1 | (0.15G) |
| ○ | × | × | ○ | × | × | ☒-☒<br>□-☒ | A-2 | — | — | B-1 | — | (0.15G) |
| ○ | × | ○ | × | × | RESTRICTED 1-WHEEL CONTROL | ☒-■<br>☒-☒ | A-3 | — | B-3 | — | — | 0.3G |
| ○ | ○ | × | × | × | RESTRICTED 1-WHEEL CONTROL | ■-☒<br>☒-☒ | A-3 | B-3 | — | — | — | 0.3G |

THREE DEFECTIVE CONTROL DEVICE

FIG. 8

□ NORMAL BRAKE   ⊠ DEFECTIVE BRAKE   ■ OPERATION-INHIBITED BRAKE

| STATES OF CONTROL DEVICES ○:NORMAL ×:DEFECTIVE | | | | CONTROL MODES | | BRAKE OPERATING STATES ○:ON ×:OFF | | | | DECELERATION |
|---|---|---|---|---|---|---|---|---|---|---|
| CENTRAL ECU | MOTOR ECUs FL | FR | RL | | WHEEL BRAKING STATES | FL | FR | RL | RR | |
| ○ | ○ | ○ | ○ | NOMAL CONTROL | □─□<br>□─□ | ○ | ○ | ○ | ○ | NORMAL BRAKING |
| × | ○ | ○ | ○ | INDEPENDENT CONTROL | □─□<br>□─□ | ○ | ○ | ○ | ○ | NORMAL BRAKING |
| ○ | × | ○ | ○ | DIAGONAL CONTROL | ⊠─□<br>□─□ | – | ○ | ○ | – | 0.5G |
| ○ | ○ | × | ○ | DIAGONAL CONTROL | □─■<br>■─□ | ○ | – | – | ○ | 0.5G |
| ○ | ○ | ○ | × | 2-FRONT-WHEEL CONTROL | □─□<br>□─⊠ | ○ | ○ | – | – | 0.7G |
| NORMAL | ONE DEFECTIVE CONTROL DEVICE | | | | | | | | | |

FIG. 9

□ NORMAL BRAKE  ⊠ DEFECTIVE BRAKE  ■ OPERATION-INHIBITED BRAKE

| STATES OF CONTROL DEVICES ○:NORMAL ×:DEFECTIVE | | | | CONTROL MODES | | BRAKE OPERATING STATES ○:ON ×:OFF | | | | DECELERATION |
|---|---|---|---|---|---|---|---|---|---|---|
| CENTRAL ECU | MOTOR ECUs FL | FR | RL | | WHEEL BRAKING STATES | FL | FR | RL | RR | |
| × | × | ○ | ○ | DIAGONAL CONTROL | ⊠□ / □■ | - | ○ | ○ | - | 0.5G |
| × | ○ | × | ○ | DIAGONAL CONTROL | □⊠ / ■□ | ○ | - | - | ○ | 0.5G |
| × | ○ | ○ | × | 2-FRONT-WHEEL CONTROL | □□ / ⊠■ | ○ | ○ | - | - | 0.7G |
| ○ | × | × | ○ | 2-REAR-WHEEL CONTROL | ⊠⊠ / □□ | - | - | ○ | ○ | 0.3G |
| ○ | × | ○ | × | 1-WHEEL CONTROL | ⊠□ / ⊠□ | - | ○ | ○ | - | 0.35G |
| ○ | ○ | × | × | 1-WHEEL CONTROL | □⊠ / □⊠ | ○ | - | - | - | 0.35G |
| ○ | ○ | ○ | × | 2-FRONT-WHEEL CONTROL | □□ / ⊠⊠ | ○ | ○ | - | - | 0.7G |

TWO DEFECTIVE CONTROL DEVICE

FIG. 10

□ NORMAL BRAKE  ☒ DEFECTIVE BRAKE  ■ OPERATION-INHIBITED BRAKE

| STATES OF CONTROL DEVICES ○:NORMAL ×:DEFECTIVE | | | | CONTROL MODES | | BRAKE OPERATING STATES ○:ON ×:OFF | | | | DECELERATION |
|---|---|---|---|---|---|---|---|---|---|---|
| CENTRAL ECU | MOTOR ECUs | | | | WHEEL BRAKING STATES | FL | FR | RL | RR | |
| | FL | FR | RL | | | | | | | |
| × | × | × | ○ | 2-REAR-WHEEL CONTROL | ☒□☒<br>□ ☒ | – | – | ○ | ○ | 0.3G |
| × | × | ○ | × | 1-WHEEL CONTROL | ☒☒<br>□ ☒ | – | ○ | – | – | 0.35G |
| × | ○ | × | × | 1-WHEEL CONTROL | ☒☒<br>☒ □ | ○ | – | – | – | 0.35G |
| ○ | × | × | × | × | ☒☒<br>☒ ☒ | – | – | – | – | 0G |
| ○ | × | ○ | × | 1-WHEEL CONTROL | ☒□<br>☒ ☒ | – | ○ | – | – | 0.35G |
| ○ | ○ | × | × | 1-WHEEL CONTROL | ☒☒<br>□ ☒ | ○ | – | – | – | 0.35G |

THREE DEFECTIVE CONTROL DEVICE

FIG. 11

□ NORMAL BRAKE  ☒ DEFECTIVE BRAKE  ■ OPERATION-INHIBITED BRAKE

| STATES OF CONTROL DEVICES ○:NORMAL ×:DEFECTIVE | | | | CONTROL MODES | | BRAKE OPERATING STATES ○:ON ×:OFF | | | | DECELERATION |
|---|---|---|---|---|---|---|---|---|---|---|
| MOTORS | | | | | WHEEL BRAKING STATES | FL | FR | RL | RR | |
| FL | FR | RL | RR | | | | | | | |
| ○ | ○ | ○ | ○ | NOMAL CONTROL | □□/□□ | ○ | ○ | ○ | ○ | NORMAL BRAKING |
| × | ○ | ○ | ○ | DIAGONAL CONTROL | ☒□/□■ | — | ○ | ○ | — | 0.5G |
| ○ | × | ○ | ○ | DIAGONAL CONTROL | □☒/■□ | ○ | — | — | ○ | 0.5G |
| ○ | ○ | × | ○ | 3-WHEEL CONTROL | □□/☒□ | ○ | ○ | — | ○ | 0.85G |
| ○ | ○ | ○ | × | 3-WHEEL CONTROL | □□/□☒ | ○ | ○ | ○ | — | 0.85G |

ONE DEFECTIVE CONTROL DEVICE

FIG. 12

□ NORMAL BRAKE    ⊠ DEFECTIVE BRAKE    ■ OPERATION-INHIBITED BRAKE

| STATES OF CONTROL DEVICES ○:NORMAL ×:DEFECTIVE | | | | CONTROL MODES | | BRAKE OPERATING STATES ○:ON ×:OFF | | | | DECELERATION | |
|---|---|---|---|---|---|---|---|---|---|---|---|
| MOTORS | | | | | WHEEL BRAKING STATES | FL | FR | RL | RR | | |
| FL | FR | RL | RR | | | | | | | | |
| × | × | ○ | ○ | 2-REAR-WHEEL CONTROL | ⊠–⊠ / □–□ | – | – | ○ | ○ | 0.3G | |
| × | ○ | × | ○ | 1-WHEEL CONTROL | ⊠–⊠ / ⊠–■ | – | ○ | – | – | 0.35G | |
| × | ○ | ○ | × | DIAGONAL CONTROL | ⊠–□ / □–⊠ | – | ○ | ○ | – | 0.5G | |
| ○ | × | × | ○ | DIAGONAL CONTROL | □–⊠ / ⊠–□ | ○ | – | – | ○ | 0.5G | |
| ○ | × | ○ | × | 1-WHEEL CONTROL | □–⊠ / ■–⊠ | ○ | – | – | – | 0.35G | |
| ○ | ○ | × | × | 2-FRONT-WHEEL CONTROL | □–□ / ⊠–⊠ | ○ | ○ | – | – | 0.7G | |
| × | × | × | ○ | × | ⊠–⊠ / ⊠–□ | – | – | – | ○ | (0.15G) | TWO DEFECTIVE CONTROL DEVICE |
| × | × | ○ | × | × | ⊠–⊠ / □–⊠ | – | – | ○ | – | (0.15G) | |
| × | ○ | × | × | 1-WHEEL CONTROL | ⊠–□ / ⊠–⊠ | – | ○ | – | – | 0.35G | THREE DEFECTIVE CONTROL DEVICE |
| ○ | × | × | × | 1-WHEEL CONTROL | □–⊠ / ⊠–⊠ | ○ | – | – | – | 0.35G | |

FIG. 13

□ NORMAL BRAKE  ⊠ DEFECTIVE BRAKE

| STATES OF CONTROL DEVICES | | | | CONTROL MODES | | BRAKE OPERATING STATES ○:ON ✕:OFF | | | | DECELERATION |
|---|---|---|---|---|---|---|---|---|---|---|
| ○:NORMAL ✕:DEFECTIVE | | | | | WHEEL BRAKING STATES | FL | FR | RL | RR | |
| | FL MOTOR ECU AND/OR MOTOR | FR MOTOR ECU AND/OR MOTOR | REAR MOTOR ECU | | | | | | | |
| ONE DEFECTIVE CONTROL DEVICE | ○ | ○ | ✕ | 2-FRONT-WHEEL CONTROL | □–□ / ⊠–⊠ | ○ | ○ | – | – | 0.7G |
| TWO DEFECTIVE CONTROL DEVICE | ○ | ✕ | ✕ | 1-WHEEL CONTROL | □–⊠ / ⊠–⊠ | ○ | – | – | – | 0.35G |
| | ✕ | ○ | ✕ | 1-WHEEL CONTROL | ⊠–□ / ⊠–⊠ | – | ○ | – | – | 0.35G |
| THREE DEFECTIVE CONTROL DEVICE | ✕ | ✕ | ✕ | ✕ | ⊠–⊠ / ⊠–⊠ | – | – | – | – | 0G |

FIG. 14

□ NORMAL BRAKE    ⊠ DEFECTIVE BRAKE    ■ OPERATION-INHIBITED BRAKE

| STATES OF CONTROL DEVICES | | | | | CONTROL MODES | | BRAKE OPERATING STATES ○:ON ×:OFF | | | | DECELERATION |
|---|---|---|---|---|---|---|---|---|---|---|---|
| | ○:NORMAL × :DEFECTIVE | | | | | | | | | | |
| | FL MOTOR ECU AND/OR MOTOR | FR MOTOR ECU AND/OR MOTOR | RL MOTOR | RR MOTOR | | WHEEL BRAKING STATES | FL | FR | RL | RR | |
| ONE DEFECTIVE CONTROL DEVICE | ○ | × | ○ | ○ | DIAGONAL CONTROL | □■–⊠□ | ○ | – | – | ○ | 0.5G |
| | × | ○ | ○ | ○ | DIAGONAL CONTROL | ⊠□–□■ | – | ○ | ○ | – | 0.5G |
| | ○ | × | × | ○ | DIAGONAL CONTROL | □■–⊠□ | ○ | – | – | ○ | 0.5G |
| TWO DEFECTIVE CONTROL DEVICE | ○ | × | ○ | × | 1-WHEEL CONTROL | □■–⊠⊠ | ○ | – | – | – | 0.35G |
| | × | × | ○ | ○ | 2-REAR-WHEEL CONTROL | ⊠⊠–□□ | – | – | ○ | ○ | 0.3G |
| | × | ○ | × | ○ | 1-WHEEL CONTROL | ⊠□–⊠□ | – | ○ | – | – | 0.35G |
| | × | ○ | ○ | × | DIAGONAL CONTROL | ⊠□–□⊠ | – | ○ | ○ | – | 0.5G |
| | ○ | ○ | × | × | 1-WHEEL CONTROL | □■–⊠⊠ | ○ | – | – | – | 0.35G |
| THREE DEFECTIVE CONTROL DEVICE | × | ○ | × | × | 1-WHEEL CONTROL | ⊠□–⊠⊠ | – | ○ | – | – | 0.35G |
| | × | × | ○ | × | × | ⊠⊠–□⊠ | – | – | ○ | – | (0.15G) |
| | × | × | × | ○ | × | ⊠⊠–⊠□ | – | – | – | ○ | (0.15G) |

VEHICLE ELECTRIC CONTROL SYSTEM WITH INPUT DEVICE CONNECTED TO CENTRAL AND PERIPHERAL CONTROL DEVICES FOR CONTROLLING ACTUATOR

This application is based on Japanese Patent Application Nos. 11-248874 filed Sep. 2, 1999 and 11-350263 filed Dec. 9, 1999, the contents of which are incorporated hereinto by reference.

BACKGROUND OF THE INVENTION

1. Field of the Invention

The present invention relates generally to an electric control system for an automotive vehicle, and more particularly to an improvement in reliability of such an electric control system.

2. Discussion of Related Art

As an example of such an electric control system for an automotive vehicle, a brake control system is disclosed in JP-B2-2791964. This brake control system includes two central control devices, four brake control devices corresponding to respective four wheels of an automotive vehicle, and an input device. The input device is a sensing device including various sensors such as a brake-pedal position sensor, wheel deceleration sensors, a steering angle sensor, brake temperature sensors, brake-lining thickness sensors, braking force sensors, and wheel speed sensors. The output signals of the brake-pedal position sensor, the wheel deceleration sensors and the steering angle sensor are applied to the two central control devices, while the output signals of the brake temperature sensors, the brake-lining thickness sensors, the braking force sensors and the wheel speed sensors are applied to the four brake control devices. One of the two central control devices controls two of the four brake control devices, while the other central control device controls the other two brake control devices. Each central control device calculates a desired barking force to be generated by a wheel brake for each wheel, on the basis of the output signals received directly from the sensors, and the output signals of the corresponding brake-lining thickness sensor and wheel speed sensor, which are received from the corresponding brake control device and which represent the brake lining thickness value and the wheel speed. The central control device applies data representative of the calculated desired braking force to the brake control device, which in turn controls the wheel brake for barking the wheel, on the basis of the desired braking force data received from the central control device and the output signals of the sensors. Thus, the control of the wheel brake is partly implemented by one of the two central control device and is also partly implemented by one of the four brake control devices. The required capacity of each central control device according to this control arrangement can be made smaller that that of a central control device which is arranged to directly control the brake for each wheel. Similarly, the required capacity of each brake control device can be made relatively small and inexpensive.

The brake control system indicated above employs two power source devices one of which is adapted to supply an electric energy to the two brake control devices connected to one of the two central control devices, and the other of which is adapted to supply an electric energy to the other two brake control device connected to the other central control device. In the event where at least one of the two brake control devices which are powered by one of the two power source devices becomes defective, the supply of the electric energy to those two brake control devices is terminated, and the other two normal brake control devices are operated to control the corresponding two wheel brakes for braking the corresponding wheels of the vehicle.

However, the brake control system described above still has a room for improvement. Namely, if a sensor connected to the central control device becomes defective, for instance, the central control device cannot calculate the desired braking force, and the corresponding brake control devices become inoperable to control the wheel brakes. In the event where one of the two power source devices becomes defective, the two brake control devices connected to that defective power source device are not operable.

The control arrangement disclosed in JP-B2-2791964 is considered generally applicable to any other electric control system for an automotive vehicle, provided the electric control system includes a peripheral control device for controlling an electrically controlled actuator device, a central control device connected to the peripheral control device, and an input device whose output is by the central and peripheral control devices, which cooperate with each other to control the actuator device. In this case, too, the control arrangement has a room for improvement.

SUMMARY OF THE INVENTION

It is therefore an object of the present invention to provide an electric control system for an automotive vehicle, which includes a central control device, a peripheral control device and an input device and which is economical to manufacture and has an improved operating reliability.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) An electric control system for an automotive vehicle, including a peripheral control device for electrically controlling an actuator device, a central control device connected to the peripheral control device, and a input device, the central control device and the peripheral control device cooperating with each other to control the actuator device on the basis of an output of the input device, wherein the input device is connected to both of the central control device and the peripheral control device.

The input device may take various forms. For instance, the input device may be adapted to receive information from an external sensing device by wireless transmission or through a communication line. Alternatively, the input device may permit the operator of the vehicle to enter necessary information, or may be a sensing device adapted to detect a physical quantity or quantities and generates an output signal representative of the detected quantity or quantities. For instance, the input device includes a sensor provided according to the mode (2) of this invention, which will be described. The sensor may be a sensor adapted to detect an amount of operation of a manually operated member operable by the operator, such as a sensor provided according to the mode (3) of this invention, which will also be described. Alternatively, the sensor may be a sensor adapted to detect a physical quantity which varies irrespective of an operation by the operator, for example, a sensor adapted to detect a temperature.

In the electric control system constructed according to the above mode (1) of this invention, the input device described above is connected to both of the central control device and the peripheral control device. Where the input device consists of a single sensor, this sensor is connected to both the central control device and the peripheral control device. Where the input device consists of a plurality of sensors, at least one of these sensors is connected to both of the central and peripheral control devices.

When the central control device and the peripheral control device are both normal, the central control device and the peripheral control device cooperate with each other to control the actuator device. For example, the central control device is arranged to determine a desired amount of operation of the actuator device on the basis of the output of the input device, and supply data representative of the determined desired amount of operation of the actuator device to the peripheral control device, so that the peripheral control device controls the actuator device according to the desired amount of operation received from the central control device. Alternatively, not only the central control device but also the peripheral control device are adapted to determine the desired amount of operation of the actuator device on the basis of the output of the input device, and the peripheral control device is adapted to compare the desired amount of operation of the actuator device determined by itself, with the desired amount of operation received from the central control device, for diagnosing the peripheral control device and the central control device for any defect thereof.

When the central control device becomes defective, the peripheral control device determines the desired amount of operation of the actuator device on the basis of the output of the input device, and controls the actuator device according to the determined desired amount of operation. In this case where the central control device is defective, the electric control system is not inoperable. Thus, the present electric control system has improved operating reliability.

In addition, the central control device and the peripheral control device according to the present invention can be made relatively small in size and relatively simple in construction. In an electric control system including only a central control device and not including any peripheral control device, the central control device must function also as a peripheral control device, for dealing with various defects in the system, in order to assure the same degree of operating reliability as the present electric control system. Accordingly, the central control device of the electric control system not including the peripheral control device is inevitably complicated in construction and relatively large in size. The manufacture of this complicated, large-sized central control device requires an exclusively designed production line, causing an increase in the cost of manufacture. Further, repairing or replacing the large-sized central control device which has been found defective would require relatively a high servicing or maintenance cost. In the electric control system according to the above mode (1) of the present invention, the operating reliability is significantly improved, owing to the provision of the peripheral control device in addition to the central control device, and owing to the connection of the input device to the peripheral control device as well as to the central control device so that the peripheral control device is operable independently of the central control device. While the present electric control system uses a larger number of control devices, the required size of each control device can be reduced, so that the control devices can be manufactured at a relatively low cost by a multi-purpose production line, and can be serviced or maintained at a relatively low cost.

(2) An electric control system for an automotive vehicle according to the above mode (1), wherein the input device includes a sensor operable to generate an output signal representative of a physical quantity.

(3) An electric control system for an automotive vehicle according to the above mode (2), wherein the sensor is operable to detect at least one of an operating force and an operating stroke of a manually operated member which is operable by an operator.

The manually operated member may be a pedal or lever operable by depression thereon by an operator of the vehicle (4) An electric control system for an automotive vehicle according to any one of the above modes (1)–(3), wherein the actuator device includes a plurality of actuators, and the peripheral control device includes a plurality of peripheral control devices connected to the plurality of actuators, respectively, and wherein the input device is connected to at least one of the plurality of peripheral control devices.

In the electric control system according to the above mode (4), at least one of the peripheral control devices is able to control the corresponding at least one actuator on the basis of the output of the input device, even when the central control device is defective.

(5) An electric control system for an automotive vehicle according to the above mode (4), wherein the input device is connected to at least two of the plurality of peripheral control devices.

In the electric control system according to the above mode (5), at least two of the peripheral control devices are able to control the corresponding at least two actuators on the basis of the output of the input device, even if the central control device is defective.

(6) An electric control system for an automotive vehicle according to the above mode (5), wherein the input device is connected to all of the plurality of peripheral control devices.

In the electric control system according to the above mode (5), all of the peripheral control devices are able to control the respective actuators on the basis of the output of the input device, even if the central control device is defective.

(7) An electric control system for an automotive vehicle according to any one of the above modes (1)–(6), wherein the input device includes a plurality of input devices whose output signals represent different kinds of information, all of the plurality of input devices being connected to the central control device and the peripheral control device.

The peripheral control device may consist of a single device or a plurality of control devices. In the above mode (7), all of the input devices are connected to the central control device and at least one peripheral control device.

In the electric control system according to the above mode (7), at least one peripheral control device is able to control the corresponding at least one actuator on the basis of the output signals of all the input devices, in the normal manner, even if the central control device is defective. The feature of the present mode (7) is available independently of the feature according to any one of the above modes (1)–(6).

(8) An electric control system for an automotive vehicle according to any one f the above modes (1)–(8), wherein the peripheral control device consists of a plurality of peripheral control devices, and the input device includes a plurality of input devices whose output signals represent a same kind of information, all of the input devices being connected to the central control device, one of the plurality of input devices being connected to at least one of the plurality of peripheral control devices while another of the plurality of input devices being connected to another of the plurality of peripheral control devices.

In the electric control system according to the above mode (8), even if the central control device and at least one but not all of the input devices are defective, the peripheral control device or devices which is/are adapted to receive the output signal or signals from the normal input device or devices is/are still normally operable. Each normally operable peripheral control device may be adapted to control only an actuator which the peripheral control device is assigned to control, or may be adapted not only to control this actuator but also supply the information received from the normal input device or devices to the other peripheral device or devices connected to the defective input device, so as to permit the above-indicated other peripheral control device or devices to be operable. When at least one of the input devices is defective while the central control device is normal, the central control device is operable on the basis of the output signal or signals received from the normal input device or devices. The feature according to the above mode (8) is available independently of the feature according to any one of the above modes (1)–(7).

(9) An electric control system for an automotive vehicle according to any one of the above modes (1)–(8), further including a plurality of power. source devices and wherein the actuator device includes a plurality of actuators, and the peripheral control device includes a plurality of peripheral control devices connected to the plurality of actuators, respectively, at least one of the plurality of power source devices being connected to at least one of the peripheral control devices while at least another of the plurality of power source devices being connected to at least another of the peripheral control devices.

In the electric control system according to the above mode (9), when one of the power source devices is defective, the peripheral control device connected to this one power source device is not operable, but the other peripheral control device or devices connected to the normal power source device or devices is/are operable, so that the electric control system is not wholly inoperable. The feature according to the above mode (9) is available independently of the feature according to the above mode (1).

(10) An electric control system for an automotive vehicle according to any one of the above modes (1)–(9), further including at least two power source devices which are mutually independently connected to the input device.

In the electric control system according to the above mode (10), when at least one of the at least two power source devices is defective, the input device is operable with an electric current supplied from the normal power source device or devices. The at least two power source devices in the present electric control system may be at least two of the plurality of power source devices provided in the electric control system according to the above mode (9). The feature according to the above mode (10) is available independently of the feature according to any one of the above modes (1)–(9).

(11) An electric control system for an automotive vehicle according to any one of the above modes (1)–(10), further including at least two power source devices which are mutually independently connected to the central control device.

In the electric control system according to the above mode (11), even when one of the at least two power source devices is defective, the central control device is operable with an electric current supplied from the other power source device or devices. The at least two power source devices in the present electric control system may be at least two of the plurality of power source devices provided in the electric control system according to the above mode (9), and/or the at least two power source devices provided in the electric control system according to the above mode (10). The feature according to the above mode (11) is available independently of the feature according to any one of the above modes (1)–(10).

(12) An electric control system for an automotive vehicle according to the above mode (11), wherein the central control device includes a main computer for controlling the actuator device, and a monitoring computer for diagnosing the main computer, each of the at least two power source devices being connected to both of the main and monitoring computers.

In the electric control system according to the above mode (12), the monitoring computer is adapted to diagnose the main computer for any defect thereof. When the main computer is defective, the central control device informs the peripheral control device that the main computer is defective, so that the peripheral control device is able to control the actuator device on the basis of the output of the input device.

Even if at least one but not all of the at least two power source devices is defective, the main and monitoring computers are both operable so that the main computer is able to control the actuator device while the monitoring computer is able to diagnose the main computer. As described above, the peripheral control device is provided as well as the central control device, and the input device is connected to the peripheral control device as well as the central control device, so that the peripheral control device is operable independently of the central control device, in the event where the central control device becomes defective. To this end, the central control device uses the monitoring computer to diagnose the main computer which is normally assigned to control the actuator device. With the provision of the peripheral control device, the number of computers required to be incorporated in the central control device can be reduced. For instance, the central control device may use only the main computer and the monitoring computer. Thus, the central control device can be reduced in size. The feature according to the above mode (12) is available independently of the feature according to any one of the above modes (1)–(10).

(13) An electric control system for an automotive vehicle according to the above mode (11), wherein the central control device includes a plurality of computers capable of performing a same function, each of the at least two power source devices being connected to the plurality of computers.

In the electric control system according to the above move (13), the plurality of computers are operable even if at least one but not all of the at least two power source devices is defective. Since the plurality of computers are capable of performing the same function, the central control device is operable even if at least one but not all of the power source devices is defective. Further, the plurality of computers are able to diagnose each other by comparison of desired amounts of operation of the actuator device determined by the respective computers. Even if at least one but not all of the computers is defective and the computers cannot be diagnosed by each other, the peripheral control device to which the input device is connected is able to determine the desired amount of operation of the actuator device on the basis of the output of the input device. By comparing the desired amount of operation determined by the peripheral control device with that determined by the central control device, the peripheral control device is able to diagnose the central control device to see if the central control device is defective or not. Since the peripheral control device is capable of controlling the actuator device in the event where the central control device is defective, the central computer need not be large-sized to deal with any defect thereof. Accordingly, the central control device can be made relatively small in size, though it includes the two or more computers.

(14) An electric control system for an automotive vehicle according to any one of the above modes (1)–(13) further including a plurality of power source devices, and wherein the actuator device includes four actuators in the form of four brakes constructed to brake a front left wheel, a front right wheel, a rear left wheel and a rear right wheel of the automotive vehicle, respectively, and the peripheral control device includes four brake control devices operable to control the four brakes, respectively, at least one of the plurality of power source devices being connected to the two brake control devices corresponding to the front left and rear right wheels which are located diagonally with respect to each other in the automotive vehicle, at least another of the plurality of power source devices being connected to the two other brake control devices corresponding to the front right and rear left wheels which are located diagonally with respect to each other in the automotive vehicle.

The brakes may be electrically or hydraulically operated brakes. Each electrically operated brake may be constructed to include, for example, a drive source in the form of a rotary electric motor, a presser member movable by the electric motor, and at least one friction member which is forced by the presser member onto a rotor rotating with the corresponding wheel of the vehicle, for braking the wheel. In this case, the brake control device controls the amount of operation of the electric motor on the basis of an amount of operation of a brake operating member. The presser member may be either a linearly movable member or a rotary member.

Each hydraulically operated brake may be constructed to include, for example, a fluid-operated actuator in the form of at least one hydraulic cylinder operated by a pressurized fluid supplied from a hydraulic pressure source, and at least one friction member which is forced by the at least one hydraulic cylinder onto a rotor rotating with the corresponding wheel of the vehicle, for braking the wheel. The hydraulic pressure source may be a master cylinder, or an electrically operated hydraulic power source including a hydraulic pump and an accumulator. Where the electrically operated hydraulic power source is used as the hydraulic power source, the brake control device may be arranged to control a solenoid-operated control valve device for regulating the pressure of the fluid pressurized by the hydraulic power source, to a level corresponding to the amount of operation of the brake operating member, so that the controlled fluid pressure is applied to the hydraulic cylinder. Where the master cylinder is used as the hydraulic pressure source, the brake control device may be arranged to control a solenoid-operated control valve device for controlling the fluid pressure in the hydraulic cylinder, in an anti-lock control fashion, for instance.

In the electric control system according to the above mode (14), one of the two sets of brake control devices which corresponds to the respective two sets of diagonally located vehicle wheels is operable even if at least one but not all of the plurality of power source devices is defective. Since the two sets of brake control devices are arranged to control the respective two sets of brakes corresponding to the respective two sets of diagonally located vehicle wheels, the braking force can be suitably distributed to the left and right vehicle wheels and the front and rear wheels. However, it is possible that the two brake control devices are provided for controlling the respective two brakes for the front left and right wheels, while the two other brake control devices are provided for controlling the respective two brakes for the rear left and right wheels. This arrangement may be better in some cases or for specific braking purposes.

(15) An electric control system for an automotive vehicle according to any one of the above modes (1)–(14), wherein the actuator device includes four actuators in the form of four brakes constructed to brake a front left wheel, a front right wheel, a rear left wheel and a rear right wheel of the automotive vehicle, respectively, and the peripheral control device includes four brake control devices operable to control the four brakes, respectively, at least two of the four brake control devices being connected to each other, and wherein when the central control device is defective, one of the at least two brake control devices connected to each other controls an operation of at least another of the at least two brake control devices.

In the electric control system according to the above mode (15), one of the above-indicated at least two brake control devices connected to each other operates, for example, to determine the same desired amount of operation of the two brakes corresponding to the above-indicated one brake control device and another of the at least two brake control devices, when the at least two brake control devices are normally operable to control the corresponding brakes and when the input device is normal. Namely, one of the at least two brake control devices operates to determine the desired amount of operation of the brake corresponding to another of the at least two brake control device such that the desired amount of operation of that brake is equal to that of the brake corresponding to the above-indicated one brake control device. Where the two brakes correspond to the front left and right wheels, the above arrangement permits even distribution of the braking force to the two front wheels and even braking of the front wheels. The desired amount of operation of one brake determined by one of the above-indicated at least two brake control devices may be used for the two brakes. Alternatively, the same desired amount of operation of the two brake may be determined by obtaining an average of the desired amounts of operation determined by the two brake control devices.

The input device may include a plurality of input devices connected to the plurality of brake control devices. When the input device to which one of the above-indicated at least two brake control devices is connected is defective, another of the at least two brake control devices may operate to supply the output of the input device received from the normal input device to the above-indicated one of the at least two brake control devices, or supply the determined desired amount of operation of the corresponding brake to the above-indicated one of the at least two brake control devices.

Where one of the above-indicated at least two brake control devices is not operable to control the corresponding brake due to a defect of a computer thereof, another of the at least two brake control devices which is normally operable may be operated to control the brake corresponding to the above-indicated one of the at least two brake control devices. The feature according to the above mode (15) is available independently of the feature according to any one of the above modes (1)–(14).

(16) An electric control system for an automotive vehicle according to the above mode (15), wherein the at least two brake control devices connected to each other consist of two brake control devices for controlling the brakes for braking the front left and right wheels.

In a braking system for an automotive vehicle, the brakes for the front wheels are generally constructed to produce a larger braking force than the brakes for the rear wheels. The arrangement according to the above mode (16) assures improved operating reliability of the front wheel brakes which are more important than the rear wheel brakes.

(17) An electric control system for an automotive vehicle according to the above mode (15) or (16), wherein each of the above-indicated at least two brake control devices connected to each other is connected to the central control device.

(18) An electric control system for an automotive vehicle according to any one of the above modes (1)–(17), wherein the actuator device includes four actuators in the form of four brakes constructed to brake a front left wheel, a front right wheel, a rear left wheel and a rear right wheel of the automotive vehicle, respectively, and the peripheral control device includes four brake control devices operable to control the four brakes, respectively, and wherein the two brake control devices for controlling the two brakes for braking the front left and right wheels are connected to the central control device, the input device being connected to each of the two brake control devices.

In the electric control system according to the above mode (18), the two brake control devices for the front left and right wheels are operable to control the corresponding two front wheel brakes even when the central control device is defective. (19) An electric control system for an automotive vehicle according to any one of the above modes (1)–(13), wherein the actuator device includes two actuators in the form of two rear-wheel brakes constructed to brake a rear left wheel and a rear right wheel, respectively, and the peripheral control device includes a common rear-brake control device for controlling the two rear-wheel brakes.

In the electric control system according to the above mode (19), the two rear-wheel brakes are not operable when the common rear-brake control device is defective. In this case, the two front-wheel brakes are operable to brake the front left and right wheels, so that the vehicle can be braked without a significant loss of running stability of the vehicle. In this respect, it is noted that the front-wheel brakes are generally arranged to produce a large braking force than the rear-wheel brakes. This arrangement results in a reduced amount of reduction of the total vehicle braking force when the two rear-wheel brakes are not operable, making it possible to brake the vehicle with an increased degree of stability by the front-wheel brakes only. The electric control system according to the above mode (19) requires a smaller number of brake control devices, and is simpler in arrangement and available at an accordingly reduced cost, while assuring a sufficient vehicle braking force without a significant loss of braking stability even when the two rear-wheel brakes are not operable.

(20) An electric control system for an automotive vehicle according to the above mode (19), wherein the actuator device further includes two actuators in the form of two front-wheel brakes constructed to brake a front left wheel and front right wheel, respectively, and the peripheral control device further includes two front-brake control devices for controlling the two front-wheel brakes.

In the electric control system according to the above mode (20), when one of the two front-brake control devices is defective, one of the two front-wheel brakes which corresponds to the other normal front-brake control device is operable, even while the rear-brake control device is also defective.

(21) An electric control system for an automotive vehicle according to the above mode (19 or (20), wherein the rear-brake control device includes an independent rear-brake control portion operable to control the two rear-wheel brakes in respective different manners.

In the electric control system according to the above mode (21), the independent rear-brake control portion of the rear-brake control device controls the two rear-wheel brakes in the different manners while the braking system including the two front-wheel brakes and the two rear-wheels brakes is normal, and/or while the braking system is defective. While the braking system is normal, the independent rear-brake control portion controls the two rear-wheel brakes independently of each other in an anti-lock control fashion, a traction control fashion, or a vehicle running stability control fashion, for example. The independent rear-brake control portion may control the two rear-wheel brakes independently of each other in desired control fashions other than the anti-lock, traction and vehicle running stability control fashions. While the braking system is defective, for instance, while one of the front-wheel brakes is defective, the independent rear-brake control portion control one of the two rear-wheel brakes in the normal manner, and inhibits an operation of the other rear-wheel brake, or control this other rear-wheel brake so as to produce a predetermined percentage of the nominal braking force which is to be produced while the braking system is normal.

(22) An electric control system for an automotive vehicle according to any one of the above modes (19)–(21), wherein the rear-brake control device includes a common rear-brake control portion operable to control the two rear-wheel brakes in a same manner.

In the electric control system according to the above mode (22), the common rear-brake control portion of the rear-brake control device controls the two rear-wheel brakes in the same manner while the braking system including the two front-wheel brakes and the two rear-wheel brakes is normal, and/or while the braking system is defective. While the braking system is normally operating to control the brakes in the normal control mode (not in the special control modes such as the anti-lock control mode), the common rear-brake control portion may control the two rear-wheel brakes so as to provide the same braking force which is determined on the basis of an amount of operation of a brake operating member. Where the braking system is normally operating to control the rear-wheel brakes in the anti-lock control mode, for example, the common rear-brake control portion may control the two rear-wheel brakes so as to provide the same braking force, which is determined by a smaller one of the desired amounts of operation of he two rear-wheel brakes which have been obtained depending upon the slipping tendencies of the two rear wheels. Where the two front-wheel brakes are defective, for instance, the common rear-brake control portion may controls the two rear-wheel brakes so as to provide the same braking force while the two rear-wheel brakes are both normal. In this case, the independent rear-brake control portion indicated above may control the two rear-wheel brakes so as to provide different braking forces.

(23) An electric control system for an automotive vehicle according to any one of the above modes (19)–(22), wherein the rear-brake control device includes a one-rear-brake control portion operable to operate one of sad two rear-wheel brakes when the other of the two rear-wheel brakes is defective.

In the electric control system according to the above mode (23), the vehicle can be braked by one of the two rear-wheel brakes even when the other rear-wheel brake is defective.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 4 is a view indicating a control mode when all of the central control device and brake control devices in the brake control system are normal, and control modes of the normal control devices when one of the control devices is defective;

FIG. 5 is a view indicating control modes of the normal control devices in the brake control system when two of the control devices are defective;

FIG. 6 is a view indicating control modes of the normal control devices in the brake control system when three of the control devices are defective;

FIG. 8 is a view indicating a control mode when all of the control devices in the brake control system of FIG. 6 are normal, and control modes of the normal modes of the normal control devices when one of the control devices is defective;

FIG. 9 is a view indicating control modes of the normal control devices in the brake control system of FIG. 7 when two of the control devices are defective;

Figure 7:
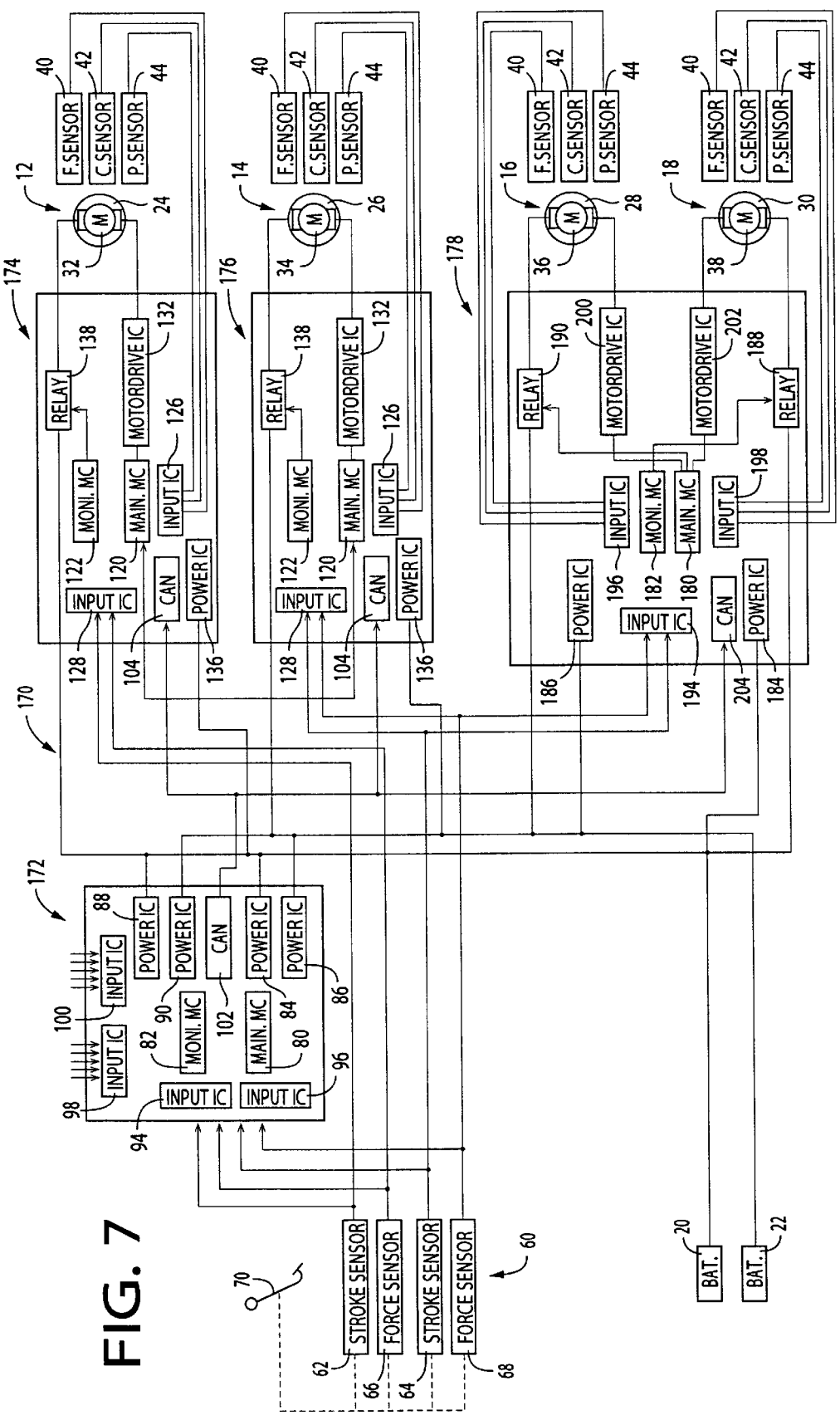
FIG. 7 is a schematic view of a braking system including a brake control system according to another embodiment of this invention.

FIG. 10. is a view indicating control modes of the normal control devices in the brake control system of FIG. 7 when three of the control devices are defective;

FIG. 11 is a view indicating the operating states of electrically operated wheel brakes in the brake control system of FIG. 7 when all of four electric motors for the brakes are normal, and the operating states when one of the motors is defective;

FIG. 12 is a view indicating the operating states of the electrically operated wheel brakes in the brake control system of FIG. 7 when two or three of the electric motors are defective;

FIG. 13 is a view indicating the operating states of the electrically operated wheel brakes in the brake control system of FIG. 7 when the motor control device for the rear wheel brakes is defective while none or at least one of the front wheel brake motors and the front wheel motor control devices is defective; and FIG. 14 is a view indicating the operating states of the electrically operated wheel brakes when the motor control device for the rear wheel brakes is normal while at least one of the front wheel motor control devices and the front and rear wheel brake motors is defective.

DETAILED DESCRIPTION OF THE PREFERRED EMBODIMENTS

Figure 1:
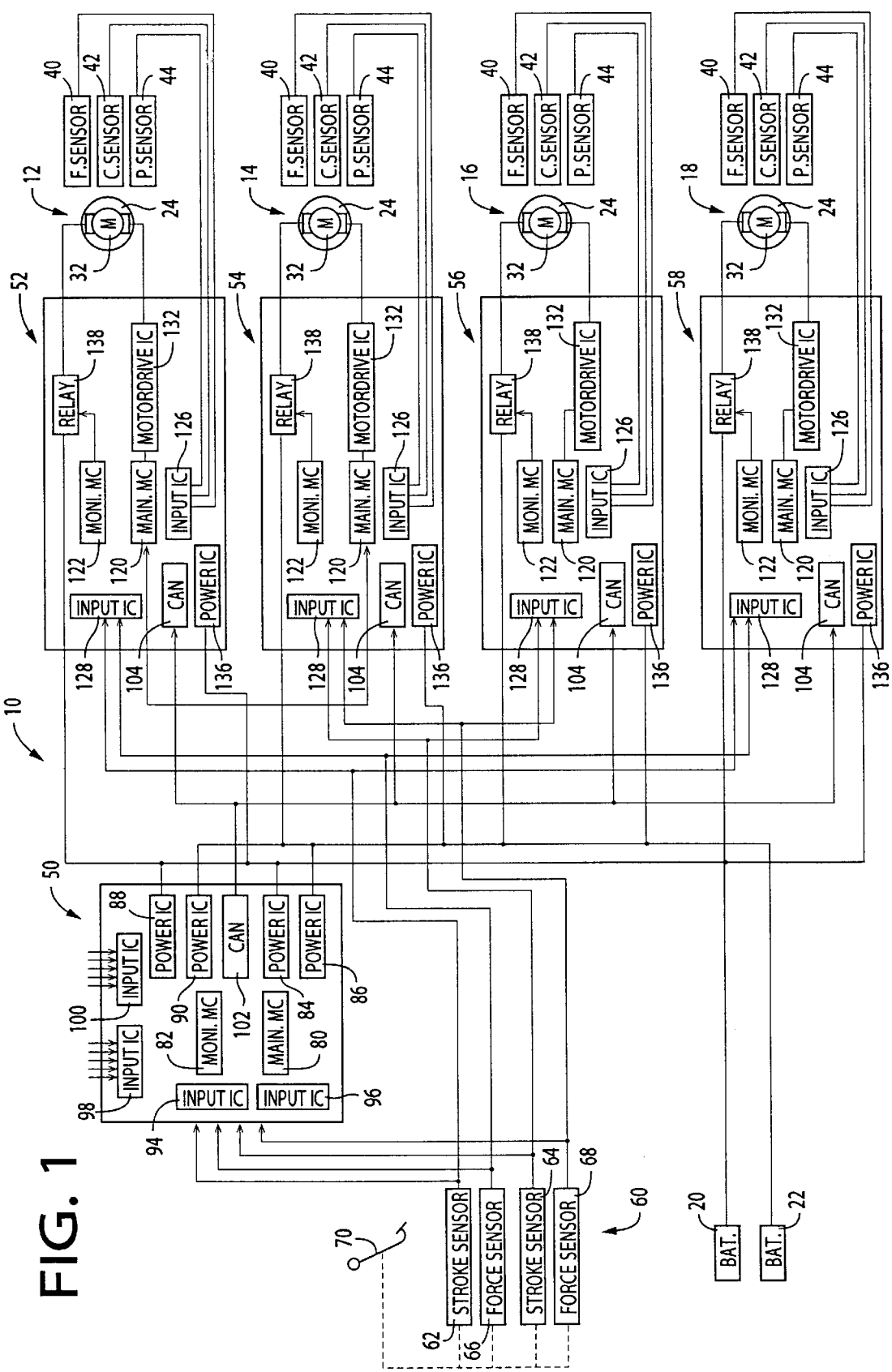
FIG. 1 is a schematic view of a braking system including a brake control system constructed according to one embodiment of this invention.

Referring first to FIG. 1, the automotive vehicle braking system shown therein and constructed according to one embodiment of this invention includes a brake control system 10, an actuator device in the form of in the form of four electrically operated wheel brakes 12, 14, 16, 18 to be controlled by the brake control system 10, and two power source devices in the form of two batteries 20, 22 which are provided independently of each other. The electrically operated wheel brakes 12, 14, 16, 18 are four actuators provided for front left and right wheels 24, 26 and rear left and right wheels 28, 30, respectively, and include respective drive sources in the form of electric motors 32, 34, 36, 38 (hereinafter referred to simply as "motors"). Each wheel brake 12, 14, 16, 18 further includes a presser member which is linearly moved by operation of the corresponding motor 32, 34, 36, 38, and friction members which are moved by the presser member by a linear movement of the presser member, into pressing contact with a rotor which rotates with the corresponding wheel. The motors 32, 34, 36, 38 may be brushless DC motors.

For each of the electrically operated brakes 12, 14, 16, 18, there are provided: a braking force sensor 40 for detecting a braking force which is applied by the presser member to the friction members; an electric current sensor 42 for detecting an electric current supplied to the corresponding motor 32, 34, 36, 38; and a position sensor 44 for detecting the angular position of the rotor of the corresponding motor 32, 34, 36, 38 relative to its stator.

The brake control system 10 includes a central control device 50, four peripheral control devices in the form of four brake control devices in the form of four motor control devices 52, 54, 56, 58, and an input device in the form of a sensing device 60 which includes two pedal stroke sensors 62, 64 and two pedal force sensors 64, 66. The two pedal stroke sensors 62, 64, which are provided independently of each other, are adapted to generate output signals indicative of an operating stroke of a brake operating member in the form of a brake pedal 70 operated by an operator of the automotive vehicle. The operating stroke of the brake pedal 70 is one form of an amount of operation of the brake operating member. Similarly, the two pedal force sensors 6, 64, which are also provided independently of each other, are adapted to generate output signals indicative of an operating force (depression force) acting on the brake pedal 70, which is another form of the amount of operation of the brake operating member. Thus, the sensing device 60 includes two groups of sensors for detecting respective different parameters or physical quantities (i.e., operating stroke and force of the brake pedal 70), and each of these two groups include two sensors for detecting the same parameter or physical quantity.

Figure 3:
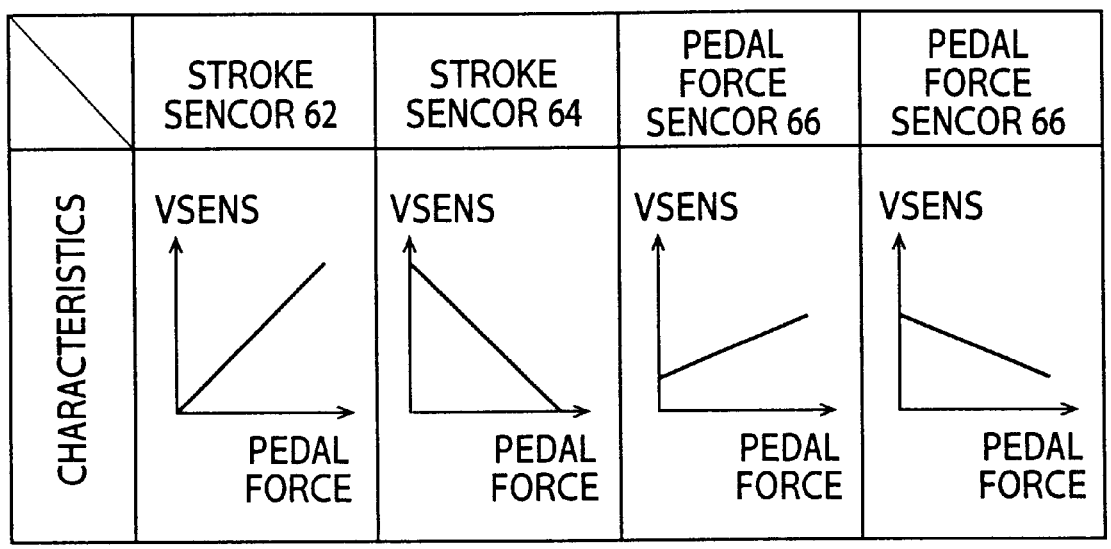
FIG. 3 is a graphical representation indicating characteristics of two pedal stroke sensors and two pedal force sensors which are included in the input device.

The two pedal stroke sensors 62, 64 have different characteristics, and the two pedal force sensors 66, 68 have different characteristics, as indicated in the graph of FIG. 3. Namely, the two pedal stroke sensors 62, 64, and the two pedal force sensors 66, 68 have different gains and offsets. The two pedal stroke sensors 62, 64 have opposite polarities, namely, opposite directions of change of their output with an increase in the operating force acting on the brake pedal 70, and the two pedal force sensors 66, 68 have opposite polarities, namely, opposite directions of change of their output with an increase in the operating force acting on the brake pedal 70. Therefore, when all of the four sensors 62, 64, 66, 68 are all normal, the values of the output signals of the four sensors when the brake pedal 70 is operated by a given amount (with a given operating force or stroke) are different from each other. The operating stroke and the operating force of the brake pedal 70 have a linear relationship, and one of the operating stroke and force changes linearly with the other. In FIG. 3, the operating force of the brake pedal 70 is taken along the abscissa of the coordinate system for the pedal stroke sensors 62, 64 as well as for the pedal force sensors 66, 68.

If any one of the four sensors 62, 64, 66, 68 becomes defective, the operating force (operating amount) represented by the output signal of the defective sensor is different from those represented by the output signals of the other three normal sensors. Accordingly, the defective sensor can be detected on the basis of the output signals of the four sensors. That is, the sensor whose output signal is different from those of the other three sensors can be considered to be defective. It is also noted that since the four sensors 62–68 have the mutually different characteristics, as described above, the operating force values (operating amounts) represented by the output signals of the two sensors which have the same defect are not identical with each other but are different from each other, so that the two other sensors whose output signals represent the same operating force value or stroke value can be considered to be normal. In other words, the two sensors whose outputs are different from each other and are also different the same output of the other two sensors can be considered to be defective. For instance, the two sensors connected to the same battery 20, 22 may have the same defect when this battery has an excessive voltage drop. Namely, these two sensors have a reduced gain. If the three of the four sensors 62, 64, 66, 68 become defective, the operating force values (operating amounts) represented by the output signals of the four sensors are different from each other, so that it is not possible to identify the defective sensor or sensors. In this event, the brake control system 10 is not operable.

The central control device 50 includes two microcomputers 80, 82, as indicated in FIG. 1. The microcomputer 80 serves as a main computer for controlling the electrically operated brakes 12, 14, 16, 18, while the microcomputer 82 serves as a monitoring computer for diagnosing the microcomputer 80. The microcomputers 80, 82 will be hereinafter referred to as the "main microcomputer 80" and "monitoring microcomputer 82", respectively.

The main microcomputer 80 is connected to two batteries 20, 22 through respective power source ICs 84, 86, while the monitoring microcomputer 82 is connected to the two batteries 20, 22 through respective power source ICs 88, 90. Thus, the two batteries 20, 22 are both connected to the main and monitoring microcomputers 80, 82.

The monitoring microcomputer 82 is arranged to apply a watching dog pulse to the main microcomputer 80 at a predetermined time interval, for diagnosing the main microcomputer 80 for any abnormality or defect. While various control routines are executed by the main microcomputer 80 to control the electrically operated brakes 12, 14, 16, 18, an interruption routine is executed to diagnose the main microcomputer 80. If the main microcomputer 80 is found normal, a response pulse indicative of the normal condition of the main microcomputer 80 is applied to the monitoring microcomputer 82 in response to the watching dog pulse. On the other hand, the main microcomputer 80 diagnoses the monitoring microcomputer 82, depending upon whether the main microcomputer 80 receives the watching dog pulse.

The main microcomputer 80 receives the output signals of the pedal stroke sensor 62 and the pedal force sensor 64 through an input IC 94, and the output signals of the pedal stroke sensor 64 and the pedal force sensor 68 through an input IC 96. The main microcomputer 80 also receives through input ICs 90, 100 the output signals of the output signals of wheel speed sensors indicative of the rotating speeds of the front left and right wheels 24, 26 and the rear left and right wheels 28, 30, the output signal of a stop switch indicative of initiation of an operation of the brake pedal 70, the output signals of deceleration sensors indicative of values of deceleration of the vehicle in the longitudinal and lateral directions, and the output signals of other sensors indicative of the steering wheel angle, vehicle yaw rate, engine operating conditions and other information of the vehicle.

The central control device 50 and the motor control devices 52, 54, 56, 58 are adapted to effect data communications therebetween through car area networks (CAN) 102, 104, 106, 108, 110. The data communication through the CANs permits transmission of a large volume of information in a short time, by unidirectional or one-way communication with superimposition of different kinds of information, and simultaneous bi-directional communication.

On the basis of the output signals of the pedal stroke sensors 62, 64 and the pedal force sensors 66, 68, the main microcomputer 80 calculates a desired braking force by which the friction members of each electrically operated brake 12, 14, 16, 18 are forced by the presser member against the rotor, and supplies the calculated desired braking force data to the motor control devices 52, 54, 56, 58 through the CANs 102, 104, 106, 108. The calculation of the desired braking force is based in principle on the operating force of the brake pedal 70 as detected by the pedal force sensors 66, 68. However, the operating stroke of the brake pedal 70 as detected by the pedal stroke sensors 62, 64 is taken into account in calculating the desired braking force, in view of a fact that an increase in the operating force as detected by the pedal force sensors 66, 68 is more or less delayed with respect to an increase in the operating stroke of the brake pedal 70. Described more specifically, the desired braking force is calculated on the basis of the detected operating force and stroke of the brake pedal 70 such that an influence of the detected operating stroke on the calculated desired braking force decreases with the time which has passed after the moment at which the operation of the brake pedal 70 was initiated. Where the two pedal force sensors 66, 68 are normal, two output signals indicative of the operating force values of the brake pedal 70 are obtained. In the present embodiment, an average of the detected two operating force values is used. However, a predetermined one of the two output signals of the two pedal stroke sensors 66, 68 may be used to calculate the desired braking force. The same applies to the two pedal stroke sensors 62, 64.

The main microcomputer 80 diagnoses the sensors 62, 64, 66, 68 for any abnormality or defect. If one or two of these four sensors is/are defective, the main microcomputer 80 calculates the desired braking force on the basis of the output signals of the normal sensors, and activate an alarm light to indicate that one or two of the sensors 62–68 is/are defective. If the three or all of the four sensors 62–58 are defective, and the braking system is not operable, the main microcomputer 80 activates the alarm light and an alarm buzzer to indicate this defective condition. The alarm light and buzzer serve as an alarm indicator. The desired braking force of the brakes 12–18 is calculated according to a control program which is formulated such that the desired braking force is calculated on the basis of the operating stroke and force as detected by the four sensors 62–68 when the four sensors 62–68 are all normal, on the basis of the operating stroke and force as detected by the normal sensors when at least one of the two pedal stroke sensors 62, 64 and one of the two pedal force sensors 66, 68 are normal, or when one of the two pedal stroke sensors 62, 64 and at least one of the two pedal force sensors 66m, 68 are normal, or on the basis of either the operating stroke or the operating force when the pedal stroke sensors 62, 64 are both defective or when the pedal force sensors 66, 68 are both defective.

The main microcomputer 80 are arranged to control the electrically operated brakes 12–18 for performing various controls such as an anti-lock braking pressure control, a traction force control and a vehicle running stability control, on the basis of the output signals of the wheel speed sensors, vehicle deceleration sensors, yaw rate sensor and other sensors as well as the output signals of the pedal stroke sensors 62, 64 and pedal force sensors 66, 68. Since these controls do not directly relate to the subject matter of the present invention, no further description of these controls is deemed necessary.

The motor control devices 52, 54, 56, 58 are provided to control the respective electric motors 32, 34, 36, 38 of the electrically controlled brakes 12, 14, 16, 18 for braking the front left wheel 24, front right wheel 26, rear left wheel 28 and rear right wheel 30, respectively. Since the four motor control devices 52–58 are identical in construction with each other, the motor control device 52 for controlling the motor 32 of the electrically operated brake 12 for the front left wheel 24 will be described in detail by way of example, and the other motor control devices 54–58 will be described to the extent necessary.

The motor control device 52 includes two microcomputers, that is, a main microcomputer 120 for controlling the motor 32, and a monitoring microcomputer 122 for diagnosing the main microcomputer 120. The main microcomputer 120 receives through an input IC 126 the output signals of the braking force sensor 40, electric current sensor 42 and position sensor 44, ad through an input IC 128 the output signals of the pedal stroke sensor 62 and the pedal force sensor 66. The motor control device 52 further includes a car area network (CAN) 104 for data communication with the central control device 50. The main microcomputer 120 determines an amount of electric current to be applied to the motor 32, on the basis of the desired braking force data received from the central control device 50 and the output signals of the braking force sensor 40, electric current sensor 42 and position sensor 44. The main microcomputer 120 controls the motor 32 through the corresponding motor drive IC 132 so as to apply the determined amount of electric current to the motor 32.

Like the monitoring microcomputer 82, the monitoring microcomputer 122 applies a watching dog pulse to the main microcomputer 120, and determines whether the main microcomputer 120 is normal or not, depending upon whether a response signal is received from the main microcomputer 120 in response to the watching dog pulse. In the meantime, the main microcomputer 120 monitors the monitoring microcomputer 122 for any abnormality or defect. The motor control device 52 further includes a power source IC 136 to which the battery 20 is connected. The batter 20 is also connected the motor 32. The monitoring microcomputer 120 controls a semiconductor relay 138 for permitting and inhibiting the supply of an electric current from the battery 20 to the motor 32.

The motor control device 54, which is identical in arrangement with the motor control device 52, is connected to the pedal stroke sensor 64 and pedal force sensor 68 and to the battery 22. The motor control device 56 is identical in arrangement with the motor control device 54 and is connected to the pedal stroke and force sensors 64, 68 and the battery 22 to which the motor control device 54 are also connected. The motor control device 58 is identical in arrangement with the motor control device 52, and is connected to the pedal stroke and force sensors 64, 68 and the battery 20 to which the motor control device 52 are also connected. Thus, the battery 20 of the two mutually independent batteries 20, 22 is connected to the motor control devices 52, 58 corresponding to the front left and rear right wheels 24, 30, while the other battery 22 is connected to the motor control devices 54, 56 corresponding to the front right and rear left wheels 26, 28. Of the four wheels 24–30 provided for the automotive vehicle, the front left and rear right wheels 24, 30 are located diagonally with respect to each other while the front right and rear left wheels 26, 28 are located diagonally with respect to each other. It is also noted that the pedal stroke sensors 62, 64 and the pedal force sensors 66, 68 are all connected to the central control device 50, and the pedal stroke sensor 62 and pedal force sensor 66 are connected to the motor control devices 52, 58 corresponding to the diagonally located front left and rear right wheels 24, 30 while the pedal stroke sensor 64 and the pedal force sensor 68 are connected to the motor control devices 54, 56 corresponding to the diagonally located front right and rear left wheels 26, 28.

The motor control device 52 corresponding to the front left wheel 24 and the motor control device 54 corresponding to the front right wheel 26 are connected to each other, for serial data communication therebetween. The serial data communication which uses one or two communication lines permits efficient data communication with digital signals.

Figure 2:
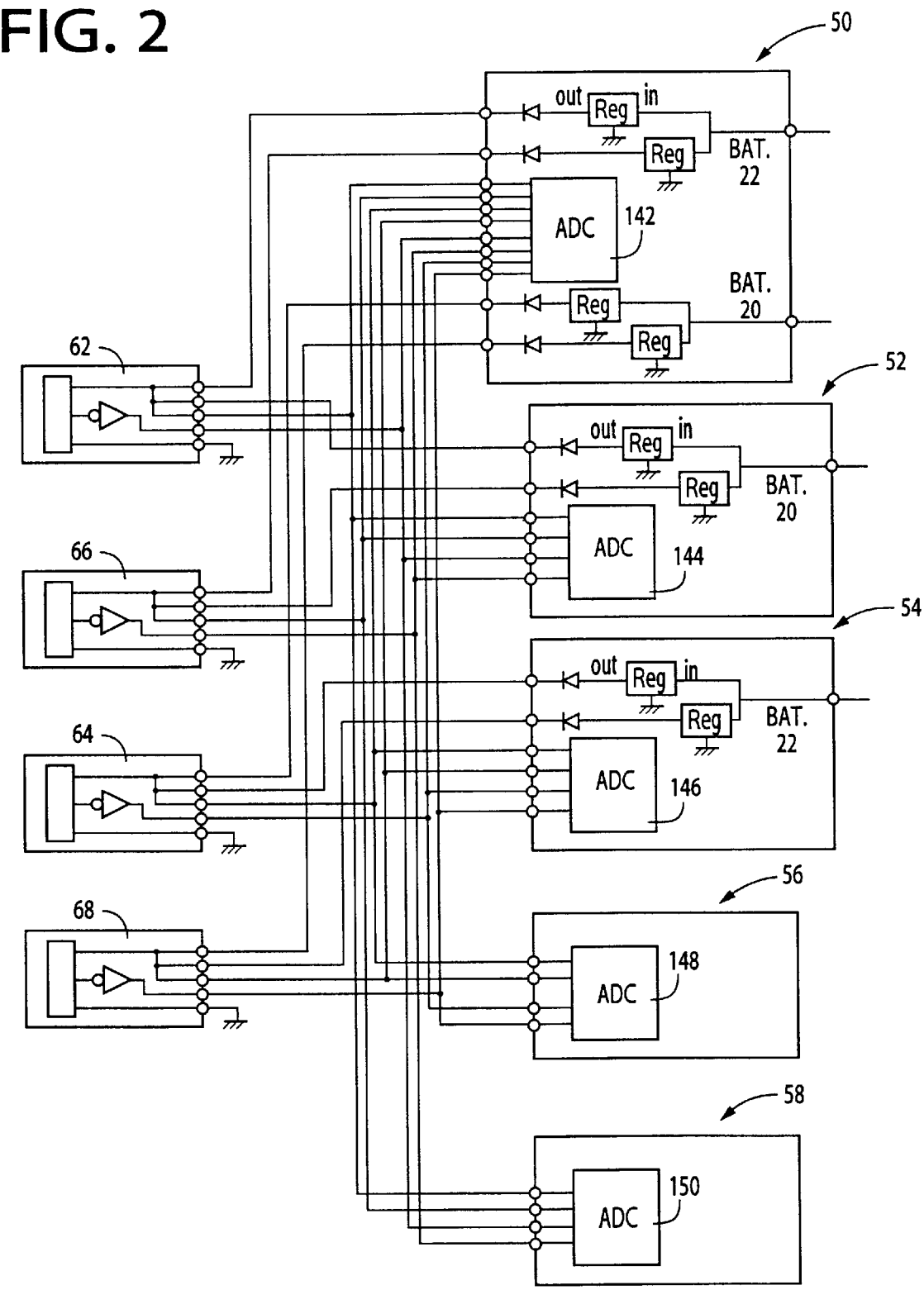
FIG. 2 is a circuit diagram illustrating interconnections of a central control device, motor control devices, a input device and batteries in the brake control system.

Referring to FIG. 2, there are shown connections of the pedal stroke sensors 62, 64 and the pedal force sensors 66, 68 to the batteries 20, 22.

As shown in FIG. 2, the pedal stroke and force sensors 62, 66 are connected to the battery 22 through the central control device 50, and to the battery 20 through the motor control device 52. The pedal stroke and force sensors 62, 66 apply a monitoring current to analog-digital converters (ADC) 142, 144, 150 of the central control device 50 and the motor control devices 52, 58. The monitoring current indicates that an electric current is being applied to the sensors 62, 66. The ADCs 142, 144, 150 are adapted to receive the output signals of the sensors 62, 66.

The pedal stroke and force sensors 64, 68 are connected to the battery 20 through the central control device 50, and to the battery 22 through the motor control device 54. The pedal stroke and force sensors 64, 68 apply a monitoring current to analog-digital converters (ADC) 142, 146, 148 of the central control device 50 and the motor control devices 54, 56. The monitoring current indicates that an electric current is being applied to the sensors 64, 68. The ADCs 142, 146, 148 are adapted to receive the output signals of the pedal stroke and force sensors 64, 68.

In the braking system constructed as described above, the main microcomputer 80 of the central control device 50 is operated upon an operation of the brake pedal 70 to calculate the desired braking force of each electrically operated brake 12, 14, 16, 18 on the basis of the operating stroke and force as detected by the pedal stroke sensors 62, 64 and the pedal force sensors 66, 68, and supplies the calculated desired braking force data to the motor control devices 52, 54, 56, 58, while all electrically operated components of the braking system such as the central control device 50, motor control devices 53, 54, 56, 58, batteries 20, 22, pedal stroke and force sensors 62, 64, 66, 68 and motors 32, 34, 36, 38 are normal. On the basis of the received desired braking force data and the output signals of the braking force sensor 40 and other sensors, the motor control devices 52–58 determine the desired amount of electric current to be applied to the motors 32–38, and control the motors 32–38 through the motor drive ICs 132.

Emergency control operations of the braking system where any electrically operated component is defective will be described. The electrically operated components include the batteries 20, 22, central control device 50, motor control devices 52, 54, 56, 58, sensors 62, 64, 66, 68 and motors 32, 34, 36, 38. There are various situations in which the braking system is abnormal. For instance, only one of the electrically operated components is defective, or any combination of two or more of the components is defective. At least one of the central and motor control devices 50, 52, 54, 56, 58 is not normally operable depending upon the kind and the number of the defective electrically operated component or components. The operations of the braking system when one, two or three of the central and motor control devices 50–58 is/are defective will be described by reference to FIGS. 4–6, respectively.

First, the case where only one of the five control devices 50–58 will be described referring to FIG. 4, wherein "CENTRAL ECU" means the central control device 50, while "MOTOR ECUs" mean the motor control devices 52, 54, 56, 58. For instance, "FL" of "MOTOR ECUs" means the motor control device 52 provided for the front left wheel 24. Similarly, "FR", "RL" and "RR" of "MOTOR ECUs" mean the motor control devices 54, 56 and 58, respectively. It is noted that "NORMAL" in the first column of the table of FIG. 4 indicates that all of the five control devices 50, 52, 54, 56, 58 are all normal. In this case, those control devices 50–58 are operated in the predetermined normal manners, as indicated by A-1 and B-1 in FIG. 4. "A-138 represents that the normal central control device 50 is operated in the normal manner, that is, calculates the desired braking force on the basis of the output signals of the sensors 62, 64, 66, 68, and applies the calculated desired braking force data to the normal motor control devices 52–58, while "B-1" represents that the normal motor control devices 52–58 control the respective motors 24–30 on the basis of the desired braking force data which is calculated by the central control device 50 on the basis of the output signals of the sensors 62–68 and which is received from the central control device 50.

There are two cases where any one of the five control devices 50–58 is defective, that is, a case when the central control device 50 is defective, and a case where one of the motor control devices 52–58 is defective. To begin with, the case where the central control device 50 is defective will be described.

The central control device 50 is defective when at least one of the main microcomputer 80 and the monitoring microcomputer 82 is defective. As described above, a defect of the main microcomputer 80 is detected by the monitoring microcomputer 82, while a defect of the monitoring computer 82 is detected by the main microcomputer 80. When at least one of the main and monitoring microcomputers 80, 82 is defectively, the main microcomputer 80 does not calculate the desired braking force, but the central control device 50 is capable of effecting data communication with the motor control devices 52–58 through the CANs 102–110, and informs each of the motor control devices 52–58 that the main microcomputer 80 is defective while the motor control devices 52–58 are normal.

Since each of the four motor control devices 52–58 receives the output signal of one of the pedal stroke sensors 62, 64 and the output signal of one of the pedal force sensors 66, 68, each motor control device is able to calculate the desired braking force by itself, on the basis of the pedal stroke and force sensors 62–68, even where the central control device 50 is defective and does not calculate the desired braking force. Accordingly, the motor control devices 52–58 are able to control the respective motors 32, 34, 36, 38 on the basis of the calculated desired braking force and the output signals of the braking force sensor 40 and other sensors. As a result, the vehicle can be decelerated as in the normal condition of the braking system in which the central control device 50 and the motor control devices 52–58 are all normally functioning. The control of the motors 32, 34, 36, 38 by the four motor control devices 52–58 independently of each other will be referred to as "independent control". In FIG. 4, "B-2" represents that when the central control device 50 is defective, the motor control devices 52–58 operate in the same manner as in the normal condition of the braking system.

In the independent control, the motor control device 52 for the front left wheel 24 and the motor control device 54 for the front right wheel 26 calculate the desired braking forces on the basis of the different pairs of pedal stroke and force sensors. In this case, therefore, the desired braking force values calculated by the motor control devices 52, 54 may be different from each other due to detection errors of the two pairs of pedal stroke and force sensors. In view of this, the motor control devices 52, 54 effect serial data communication therebetween, to use the same desired braking force value. For instance, the two motor control devices 52, 54 obtain the same desired braking force value by averaging the two desired braking force values calculated by them.

Then, there will be described cases where only one of the four motor control devices 52–58 is defective. Each motor control device 52, 54, 56, 58 may be defective when at least one of the main microcomputer 120 and the monitoring microcomputer 122 is defective, and/or the corresponding motor 32, 34, 36, 48 is defective. Each motor control device is considered defective even when it is normal, if the corresponding motor 32, 34, 36, 38 is defective. The main and monitoring microcomputers 120, 122 are diagnosed in response to the watching dog pulse, while the motors 32–38 are diagnosed by the main microcomputer 120 on the basis of the output signals of the braking force sensor 40 and other sensors and on the basis of the desired braking force. If, for instance, an increase in the amount of electric current applied to the motor 32, 34, 36, 38 does not result in an increase in the actual braking force produced by the corresponding brake 12, 14, 16, 18, the motor is considered to be defective. When one of the motor control devices 52–58 or one of the motors 32–38 is found defective, the central control device 50 and the motor control devices 52–58 are so informed through the CANs 102–110. When at least one of the motor control devices 52–58 is defective, the semiconductor relay 138 of each defective motor control device is controlled to cut off the supply of the electric current to the defective motor control device.

There will next be described the case where the motor control device 52 is defective. When the motor control device 52 is defective, the central control device 50 determines control modes of the motor control devices 54, 56, 58. Namely, the central control device 50 inhibits the operation of the motor control device 58 for the rear right wheel 30 which is located diagonally with respect to the front left wheel 24 corresponding to the defective motor control device 52, as indicated at "B-5" in FIG. 4. However, the central control device 50 applies the normally calculated desired braking force data to the other motor control devices 54, 56 corresponding to the other pair of diagonally located front right and rear left wheels 26, 28, for controlling the corresponding motors 34, 36 for braking the wheels 26, 28 as in the normal condition, as indicated at "B-1" in FIG. 4. This control of the motors 34, 36 for the diagonally located wheels 26, 28 is referred to as "diagonal control". This diagonal control permits brake application to the vehicle so as to establish a maximum vehicle deceleration value of 0.5 G, which is 50% of the deceleration value in the normal brake application, that is, permits a braking effect which is 50% of the normal total vehicle braking effect. "A-2" in FIG. 4 represents that the control mode of the central control device 50 when at least one of the motor control devices 50–58 is defective, and "B-5" represents that the operation of the motor control device 56, 58 is inhibited while the central control device 50 is normal.

The diagonal control of the motor control devices 52, 58 is effected when the motor control device 54 is defective.

Where the motor control device 56 is defective, the central control device 50 applies the calculated desired braking force data to the normal three motor control devices 52, 54, 58 for controlling the respective motors 32, 34, 38. The controls of these the motors 32, 34, 38 by the respective motor control devices 52, 54, 58 are referred to as "3-wheel control". This 3-wheel control permits brake application to the vehicle so as to establish a maximum vehicle deceleration value of 0.85 G, which is 85% of the deceleration value in the normal brake application, that is, permits a braking effect which is 85% of the normal total vehicle braking effect.

The 3-wheel control of the motor control devices 52, 54, 56 is effected when the motor control device 58 is defective.

Referring next to FIG. 5, there will be described cases where two of the five control devices 50–58 are defective.

First, there will be described the cases where the central control device 50 and one of the motor control devices 52–58 are defective. In this case, the central control device 50 is defective due to a defect of at least one of the main and monitoring microcomputers 80, 82, while one of the motor control devices 52–58 is defective due to a defect of at least one of the main and monitoring microcomputers 120, 122, due to a defect of the corresponding motor 32, 34, 36, 38, or due to a defect of any one or ones of the pedal stroke and force sensors 62, 64, 66, 68.

Since the two pairs of the pedal stroke and force sensors 62, 64, 66, 68 are connected to the central control device 50, the central control device 50 is able to calculate the desired braking force even if one pair of the sensors 62–68 is defective, that is, able to calculate the desired braking force on the basis of the output signals of the normal pair of sensors. However, only one of the two pairs of pedal stroke and force sensors 62–68 is connected to each motor control device 52, 54, 56, 58, so that if one of the pedal stroke and force sensors is defective, the motor control device to which that pair of pedal stroke and force sensors is connected is not able to identify the defective one of the pair. Therefore, if at least one of the pedal stroke and force sensors of one pair is defective, that one pair is defective. A defect of at least one of the two pairs of pedal stroke and force sensors 62–68 can be detected by comparing the output signals of the pedal stroke and force sensors of each pair. When at least one of the two pairs of pedal stroke and force sensors 62–68 is defective, the motor control devices to which the defective pair or pairs is/are connected are not able to calculate the desired braking force on the basis of the pedal stroke and force sensors.

There will the described the case where the central control device 50 and the motor control device 52 for the front left wheel 24. In this case, the motor control device 52 is defective due to a defect of at least one of the main and monitoring microcomputers 120, 122, and/or a defect of the motor 32, so that the diagonal control of the motor control devices 54, 56 is effected so as to establish a maximum vehicle deceleration value of 0.5 G, which is 50% of the normal total vehicle braking effect. The motor control devices 54–60 are informed by the central control device 50 and the motor control device 52 that those control devices 50, 52 are defective. The motor control device 58 for the rear right wheel 30 is not operated, and the motor control devices 54, 56 calculate the desired braking force on the basis of the output signals of the pedal stroke and force sensors 64, 68 as in the normal condition of the braking system, for controlling the respective motors 34, 36. In FIG. 5, "B-6" represents that the operation of the motor control device 58 is inhibited while the central control device 50 is defective.

The diagonal control of the motor control devices 52, 58 is effected when the central control device 50 and the motor control device 54 for the front right wheel 26 is defective.

There will be described the case where the central control device 50 and the motor control device 56 for the rear left wheel 28 are defective. In this case, the motor control device 56 is defective due to a defect of at least one of the main and monitoring microcomputers 120, 122, due to a defect of the corresponding motor 34, and/or due to a defect of one of the two pairs of pedal stroke and force sensors 62–68. If the pair of pedal stroke and force sensors 64, 68 to which the motor control device 56 is connected is defective, the output signals of the sensors 64, 68 are not applied to the motor control device 54 for the front right wheel 26, either, but the motor control device 54 is able to effect serial data communication with the motor control device 52, for obtaining the output signals of the normal sensors 62, 66 from the motor control device 52. Although the defect of the sensors 64, 68 does not permit the normal operation of the motor control device 56 but permits the normal operation of the motor control device 52, thereby permitting a comparatively large braking effect (0.85 G).

When the motor control device 56 is defective due to a defect of at least one of the main and monitoring microcomputers 120, 122 and the motor 36, each of the motor control devices 52, 54, 58 is able to control the corresponding motor on the basis of the desired braking force calculated on the basis of the sensors 62–68. Since the motor control devices 52, 54 effect serial data communication with each other to determine the same desired braking force value, for equal braking effects provided by the brakes 12, 14 for the two front wheels 24, 26. When the motor control device 56 is defective due to a defect of the corresponding pair of pedal stroke and force sensors 64, 68, the motor control devices 52, 58 are able to control the corresponding motors 32, 38 on the basis of the desired braking force calculated on the basis of the output signals of the normal pair of sensors 62, 66, while the motor control device 54 is able to control the corresponding motor 34 on the basis of the desired braking force calculated on the basis of the output signals of the normal pair of pedal stroke and force sensors 62, 66 received from the motor control device 52. The desired braking force is calculated in the same manner as in the normal condition of the braking system in which the desired braking force is calculated by the central control device 50. Thus, the 3-wheel control of the motors 32, 34, 38 is effected so as to establish a vehicle deceleration value of 0.85 G, which is 85% of the normal total vehicle braking effect.

The 3-wheel control of the motors 32, 34, 36 is effected when the central control device 50 and the motor control device 58 for the rear right wheel 30 are defective.

Then, there will be described cases where the two of the motor control devices 52–58 are defective. In these cases, the central control device 50 is normal and therefore calculates the desired braking force and applies the calculated desired braking force data to the motor control devices 52–58. Each motor control device 52, 54, 56,5 8 is defective due to a defect of at least one of the main and monitoring microcomputers 120, 122, due to a defect of the corresponding motor 32, 34, 36, 38, and/or due to a defect of at least one of the two batteries 20, 22. The battery 20 is connected to the motor control devices 52, 58 while the battery 22 is connected to the motor control devices 54, 56. If one of the batteries 20, 22, the corresponding two motor control devices are not operable. The two batteries 20, 22 are connected to the central control device 50, so that the central control device 50 is operable even if one of the two batteries 20, 22 is defective. The battery 20, 22 is defective if an electric current is not applied to the motor control devices 50–58. While the central control device 50 is normal, each motor control device is supplied with the desired braking force calculated by the central control device 50, so that the motor control devices 52–58 are operable even if one of the two pairs of pedal stroke and force sensors 62–68 is defective.

There will be described the case where the motor control devices 52, 54 for the front left and rear wheels 24, 26 are defective. The motor control device 52, 54 is defective due to a defect of at least one of its main and monitoring microcomputers 120, 122 and/or a defect of the corresponding motor 32, 34. Since the central control device 50 is normal, it is able to calculate the desired braking force, and the motor control devices 56, 58 are able to control the motors 36, 38 on the basis of the calculated desired braking force data received from the central control device 50. The braking system according to the present embodiment is adapted such that the braking forces to be generated by the rear brakes 16, 18 for the rear wheels 28, 30 are smaller than those to be generated by the front brakes 12, 14 for the front wheels 24, 26. More specifically described, the braking force to be applied to each rear wheel 28, 30 is 15% of the total braking force to be applied to the vehicle, so that when the motor control devices 52, 54 are defective, the motors 36, 38 are operated so as to establish a maximum vehicle deceleration value of 0.3 G, which is 30% of the normal total vehicle braking effect. This control of the motors 36, 38 by the motor control devices 56, 58 is referred to as "2-rear-wheel control".

There will be described the case where the motor control devices 52, 56 for the two left wheels 24, 28 are defective. Each of these motor control devices 52, 56 is defective due to a defect of at least one of the main and monitoring microcomputers 120, 122, and/or a defect of the corresponding motor 32, 36. In this case, the central control device 50 inhibits the operation of the motor control device 58 for the rear right wheel 30, and applies the desired braking force data to the motor control device 54 for the front right wheel 26. However, this desired braking force is made smaller than the normal value so that the motor 34 is operated so as to establish a maximum vehicle deceleration value of 0.3 G, which is 30% of the normal total vehicle braking effect. Where the central control device 50 and the motor control devices 52–58 are all normal, the braking force to be applied to each of the front left and right wheels 24, 26 is 35% of the total vehicle braking force in the normal condition of the braking system. In the present abnormal condition, the desired braking force to be applied to the front right wheel 26 is reduced to 30% of the normal total vehicle braking force. This control of the motor 34 is referred to as "restricted 1-wheel control". In FIG. 5, "A-3" represents the control mode of the central control device 50, while "B-3" represents the restricted operation of the motor 34, 32, by the motor control device 54, 52 while the central control device 50 is normal.

The restricted 1-wheel control of the motor control device 52 is effected where the motor control devices 54, 58 for the two right wheels 26, 30 are defective.

Where the motor control devices 52, 58 for the diagonally located front left and rear right wheels 24, 30 are defective, each of these control devices 52, 58 is defective due to a defect of at least one of the microcomputers 120, 122, due to a defect of the corresponding motor 32, 38, and/or due to a defect of one of the batteries 20, 22. Even in the case of a defect of one of the two batteries 20, 22, the central control device 50 to which the normal battery is connected is normally operable to apply the normally calculated desired braking force data to the motor control devices 54, 56, so that the diagonal control of these motor control devices 54, 56 is effected so as to establish a maximum vehicle deceleration value of 0.5 G, which is 50% of the normal total vehicle braking effect. In this case wherein the motor control devices 52, 58 are defective, it is not necessary to inhibit the operation of the motor control device 58 for the rear right wheel 30, contrary to the cases where one of the control devices 50–56 is defective or where the central control device 50 and one of the motor control devices 52–56 are defective.

The diagonal control of the motors 32, 38 is effective where the motor control devices 54, 56 are defective.

There will be described the case where the motor control devices 56, 58 for the rear left and right wheels 28, 30 are defective. In this case, each of the motor control devices 56, 58 is defective due to a defect of at least one of the microcomputers 120, 122 and/or due to a defect of the corresponding motor 36, 38. The central control device 50 applies the normally calculated desired braking force data to the motor control devices 52, 54 for the front wheels 24, 26, to control the motors 32, 34 so as to establish a maximum vehicle deceleration value of 0.7 G, which is 70% of the normal total vehicle braking effect. As described above, the braking force to be applied to each front wheel 24, 26 is determined to be 35% of the total vehicle braking force in the normal condition of the braking system.

Referring next to FIG. 6, there will be described cases where three of the control devices 50–58 are defective. In these cases, the central control device 50 and two of the four motor control devices 52–58 are defective, or the three of the four motor control devices 52–58 are defective. In the former case, the central control device 50 is defective due to a defect of at least one of the main and monitoring microcomputers 80, 82, for example, while each of the two motor control devices is defective due to a defect of at least one of the main and monitoring microcomputers 120, 122, due to a defect of the corresponding motor 32, 34, 36,, 38, due to a defect of corresponding one of the two pairs of pedal stroke and force sensors 62–68, and/or due to a defect of one of the two batteries 20, 22.

In the case where the defective control devices include the central control device 50 and where the motor control devices 52, 54 for the front left and right wheels 24, 26 are defective due to a defect of at least one of the microcomputers 120, 122 and/or due to a defect of the corresponding motors 34, 36, the "2-rear-wheel control" of the motors 36, 38 is effected so as to establish a maximum vehicle deceleration value of 0.3 G, which is 30% of the normal total vehicle braking effect. In this case where the central control device 50 is defective, the motor control devices 56, 58 calculate the desired braking forces by themselves and controls the motors 36, 38 on the basis of the thus calculated desired braking forces.

In the case where the motor control devices 52, 56 for the two left wheels 24, 28 as well as the central control device 50 are defective, these motor control devices 52, 56 are defective due to a defect of at least one of the microcomputers 120, 122 and the corresponding motors 32, 36, for instance. In this case, the "restricted 1-wheel control" of the motor 34 is effected. In this case wherein the central control device 50 is defective, the motor control device 58 is not operated on the basis of information that the central control device 50 and the motor control devices 52, 56 are defective. On the other hand, the motor control device 54 for the front right wheel 26 calculates the desired braking force such that the calculated braking force is made smaller than in the normal condition of the braking system, for operating the corresponding motor 34 so as to establish a maximum vehicle deceleration value of 0.3 G, which is 30% of the normal total vehicle braking effect. In FIG. 6, "B-4" represents that the restricted operation of the motor 34 or 32 while the central control device 50 is defective.

The "restricted 1-wheel control" of the motor 32 is effected where the motor control devices for the two right wheels 26, 30, as well as the central control device 50, are defective.

In the case where the defective two motor control devices are the motor control devices 52, 58 for the diagonally located front left and rear right wheels 24, 30, or the motor control devices 54, 56 for the diagonally located front right and rear left wheels 26, 28, the motor control device 52, 54 is defective due to a defect of at least one of the microcomputers 120, 122, corresponding motors 33, 34 and one of the batteries 20, 22, and the motor control device 56, 58 is defective due to a defect of at least one of those components and one of the two pairs of pedal stroke and force sensors 62–68. In this case, the normal two motor control devices 54, 56, or 52, 58 calculate the desired braking forces on the basis of the output signals of the normal pair of pedal stroke and force sensors 62–68 as in the normal condition, and control the corresponding motors, so that the diagonal control of the two motors corresponding to the normal motor control devices is effected so as to establish a maxim vehicle deceleration value of 0.5 G, which is 50% of the normal total vehicle braking effect. Even in the case of a defect of one of the two batteries 20, 22, which are connected to the pedal stroke and force sensors 62–68, the operating stroke and force of the brake pedal 70 can be detected by the pedal stroke and force sensors 62–68, and the normal motor control devices are able to control the corresponding motors according to the desired braking force calculated on the basis of the output signals of the sensors 62–68.

In the case where the defective motor control devices are the motor control devices 56, 58 for the rear left and right wheels 28, 30, the motor control devices 56, 58 are defective due to a defect of at least one of the microcomputers 120, 122, corresponding motors 36, 38 and pedal stroke and force sensors 62–68. However, a defect of the sensors 62–68 should not exist for the two defective motor control devices so that the motors 32, 34 can be controlled by the normal motor control devices 52, 54. Where one of the two defective motor control devices 56, 58 is defective due to a defect of one of the two pairs of pedal stroke and force sensors 62–68, one of the motor control devices 52, 54 is able to calculate the desired braking force on the basis of the output signals of the other normal pair of pedal stroke and force sensors 62–68, and the other motor control devices 52, 54 which is connected to the defective pair of sensors 62–66 is able to obtain the desired braking force data from the above-indicated one of the motor control devices 52, 54 by serial data communication with this one motor control device 52, 54. Thus, even where one of the two defective motor control devices 56, 58 is defective due to a defect of one of the two pairs of pedal stroke and force sensors 62–68, the motor control devices 52, 54 are able to control the corresponding motors 32, 34 so as to establish a maximum vehicle deceleration value of 0.7 G, which is 70% of the normal total vehicle braking effect.

There will be described the case where the three defective control devices are all motor control devices. In this case wherein the central control device 50 is normal, the defective control devices are defective due to a defect of at least one of the microcomputers 120, 122, corresponding motors and one of the batteries 20, 22. A defect of one of the batteries 20, 22 may be a cause for the two motor control devices corresponding to the two diagonally located wheels. If the three defective motor control devices include the two motor control devices 52, 54 corresponding to the two front wheels 24, 26, in other words, if the normal motor control device is one of the motor control devices 56, 58 corresponding to the rear wheels 28, 30, this one motor control device 56, 58 controls the corresponding motor 28, 30 so as to establish a maximum vehicle deceleration value of 0.15 G, which is 15% of the normal total vehicle braking effect. This 15% value is a predetermined distribution of the total braking force to each of the rear wheels 28, 30 while all of the five control devices 50, 52, 54, 56, 58 are normal. The normal central control device 50 calculates the desired braking force corresponding to the 15% value of the total vehicle braking effect, and controls the motor 28, 30 according to the calculated desired braking force. However, since this braking effect provided by one of the brakes 16, 18 of the rear wheels 28, 30 is not sufficient for braking the vehicle, the central control device 50 generates a signal for turning off the vehicle drive power source to stop the vehicle and signals for activating the appropriate alarm light and buzzer to inform the vehicle operator that the brake control system is defective.

In the case where the defective motor control devices include the motor control devices 56, 58 corresponding to the rear left and right wheels 28, 30, in other words, in the case where the normal motor control device is one of the motor control devices 52, 54 corresponding to the front left and right wheels 24, 26, the restricted 1-wheel control of the motor 32, 34 corresponding to this normal motor control device 52, 54 is effected by the normal motor control device 52, 54, so as to establish a maxim vehicle deceleration value of 0.3 G, which is 30% of the normal total vehicle braking effect. In this restricted 1-wheel control of the motor 32, 34 wherein the motor control devices 56, 58 for the rear wheels 28, 30 are defective, it is not necessary to inhibit the operation of one of these motor control devices 56, 58. The central control device 50 calculates the desired braking force corresponding to the 30% value of the braking effect, which is smaller. than the normal value of 35%.

The above-described operations to control the motors 32–38 for controlling the electrically operated brakes 12–18 when at least one of the five control devices 50–58 is defective are implemented according to emergency control programs stored in the ROM of the main microcomputer 80 of the central control device 50 and in the ROM of the main microcomputer 80 of each motor control device 52–58. When the central control device 50 is normal, this control device 50 is operated to implement the emergency control operations according to the emergency control programs stored therein. When the central control device 50 is defective, the normal motor control device or devices 52–58 is/are operated to execute the emergency control programs stored therein on the basis of abnormality information received through the CANs 102, 104, 106, 108, 110, for implementing the emergency control operations.

Where the motor control devices 52, 54 are not able to receive the desired braking force data from the central control device 50 due to a defect of the CANS 102–110, these motor control devices 52, 54 effect serial data communication with each other, to determine whether these motor control devices 52, 54 are both normal, and supply the calculated desired braking force data from one of the motor control devices 52, 54 to the other if it is determined that these two motor control devices are both normal. In this case, the desired braking force calculated by one of the motor control devices 52, 54 is commonly used for the front left and right wheels 24, 26 so as to assure even distribution of the braking force to the two front wheels 24, 26. A defect of the CAN 102 is one cause for a defect of the central control device 50. If at least one of the motor control devices 52, 54 for the front wheels 24, 26 is normally operable in the event of a defect of the CAN 102, the motors 32, 34 can be controlled by the motor control devices 52, 54 so as to obtain 70% of the normal vehicle deceleration value. Although two sets of CANs 102–110 may be provided so that one set can be used when the other set is defective, this arrangement increases the cost of manufacture of the brake control system 10. The present embodiment which uses only one set of CANs 102–110 and is available at an accordingly low cost assures a vehicle braking effect which is 70% of the normal braking effect, and even distribution of the braking force to the front left and right wheels, 24, 26, even when the CAN 102 is defective.

In the embodiment described above, a defect of each motor 32, 34, 36, 38 is considered as one cause for a defect of the corresponding motor control device 52, 54, 56, 58, and the emergency control operation is implemented when any one of the motors 32–38 is defective. The braking system for an automotive vehicle is considered defective either when the brake control system 10 is defective, or when at least one of the electrically operated brakes 12, 14, 16, 18 is defective. The brake control system 10 is defective when at least one of the central control device 50 and the motor control devices 52, 54, 56, 58 is defective, while a braking mechanism consisting of the electrically operated brakes 12, 14, 16, 18 is defective when at least one of the motors 32, 34, 36, 38 is defective, for example. In the above embodiment, the four motors 32–38 are provided for the respective four electrically operated brakes 12–18, and are controlled by the respective four motor control devices 52–58. In the emergency control operations illustrated in FIGS. 4–6, the control modes and operating states of the control devices 50–58 are determined by and change depending upon the number of the defective control devices 50–58 and the location or locations of the wheel or wheels 24–30 corresponding to the defective motor control device or devices 52–58, but do not change depending upon whether the defect of the specific motor control device 52–58 is caused by a defect of the corresponding motor 32–38 or not, and whether the defect of the specific motor control device 52–58 includes a defect of at least one of the microcomputers 120, 122 or other defect directly associated with the motor control device, as well as a defect of the corresponding motor 32–38. In other words, the emergency control programs stored in the ROMs of the main microcomputers 80, 120 of the control devices 50–58 are formulated to determine the control modes and operating states of the control devices 50–58 depending upon the number of the defective control devices and the locations of the wheels corresponding to the defective motor control devices or defective motors. When the central control device 50 is normal, the emergency control programs are executed by the central control device 50. When the central control device 50 is defective, the emergency control programs are executed by the normal motor control devices.

In the first embodiment of this invention which has been described above, the four motor control devices 52, 54, 56, 58 are provided for controlling the respective four motors 32, 34, 36, 38 of the respective four electrically operated brakes 12, 14, 16, 18 for braking the front left and right wheels 24, 26 and the rear left and right wheels 28, 30. However, a single motor control device may be provided for controlling the respective two motors 36, 38 of the electrically operated brakes 16, 18 for braking the rear left and right wheels 28, 30. This modification will be described as a second embodiment of the invention, referring to FIGS. 7–14. The second embodiment is identical with the first embodiment except for the provision of the single motor control device for the two brakes 16, 18 for the rear wheels 28, 30. In FIGS. 7–14, the same reference signs as used in the first embodiment are used to identify the functionally corresponding elements, and a redundant description of these elements will not be provided.

As shown in FIG. 7, a brake control system 170 according to the second embodiment includes a central control device 172, a front-left-brake motor control device 174 for controlling the motor 32 of the electrically operated brake 12, a front-right-brake motor control device 176 for controlling the motor 34 of the electrically operated brake 14, and a rear-brake motor control device 178 for controlling the motors 36, 38 of the electrically operated brakes 16, 18. The central control device 172 is identical in construction with the central control device 50, and the motor control devices 174, 176 are identical in construction with the motor control devices 52, 54. The same reference signs as used in the first embodiment with respect to the control devices 50, 52, 54 will be used to identify the corresponding elements of the control devices 172, 174, 176, and a redundant description of these elements will not be provided.

The rear-brake motor control device 178 includes two microcomputers 180, 182. The microcomputer 180 is a main computer for controlling the electrically controlled brakes 16, 18, while the microcomputer 182 is a monitoring computer for diagnosing the microcomputer 180 for any defect. The microcomputers 180, 182 will be referred to as "main microcomputer" and "monitoring microcomputer", respectively.

Each of the main and monitoring microcomputers 180, 182 is connected to both of the batteries 20, 22 through respective power source ICs 184, 186. Namely, the main and monitoring microcomputers 180, 182 are connected to the two batteries 20, 22. Like the main and monitoring microcomputers 80, 82 in the first embodiment, the main and monitoring microcomputers 180, 182 diagnose each other, with a watching dog pulse being transmitted therebetween. The batteries 20, 22 are connected to the respective motors 38, 36 through respective semiconductor relays 188, 190. The semiconductor relay 188 is controlled by the monitoring microcomputer 182, while the semiconductor relay 190 is controlled by the main microcomputer 180.

The main microcomputer 180 is adapted to receive the output signals of the pedal stroke sensor 64 and the pedal force sensor 68 through an input IC 194. The main microcomputer 180 is further adapted to receive through an input IC 196 the output signals of the braking force sensor 40, electric current sensor 42 and position sensor 44 provided for the rear left wheel 28, and through an input IC 198 the output signals of the sensors 40, 42, 44 provided for the rear right wheel 30. The main microcomputer 180 determines the amount of electric current to be applied to the motors 36, 38, on the basis of the desired braking force calculated by the central control device 172, and the output signals of the braking force sensors 40, electric current sensors 42 and position sensors 44, so that the motors 36, 38 are operated independently of each other with the determined amount of electric current being applied to the motors 36, 38 through respective motor drive ICs 200, 202. The rear-brake motor control device 178 further includes a CAN (car area network) 204 for data communication with the central control device 172 and the front-brake motor control devices 174, 176.

While the braking system is normal without any defect of its elements, the central control device 172 calculates a desired braking force upon an operation of the brake pedal 70, and supplies data representative of the calculated desired braking forces to the motor control devices 174, 176, 178, so that the four electrically operated brakes 12, 14, 16, 18 are operated to brake the respective wheels 24, 26, 28, 30, so a to provide the desired total braking force. The central control device 172 calculates the same desired braking force for the two rear brakes 16, 18, and the rear-brake motor control device 178 controls the motors 36, 38 such that the braking forces produced by the two rear brakes 16, 18 are equal to each other. However, the central control devices 172 may calculate two different desired braking force values for the two rear brakes 16, 18, and the rear-brake motor control device 178 controls the motors 36, 38 so that the two brakes 16, 18 provide different braking forces. When the braking system becomes defective, the operating states of the electrically operated brakes 12, 14, 16, 18 are determined depending upon the specific abnormality of the braking system, as indicated in FIGS. 8–14. There will be described defects which may take place in the braking system.

In the present second embodiment, the defects of the braking system are classified into three groups: defects of the brake control system 170; defects of the electrically controlled brakes 12, 14, 16, 18; and combinations of the defects of the brake control system 170 and the defects of the brakes 12–18. The brake control system 170 is defective when at least one of the central control device 172 and the motor control devices 174, 176, 178 is defective. Like the central control device 50, the central control device 172 is defective when at least one of the main and monitoring microcomputers 180, 182 is defective. Each of the front-brake motor control devices 174, 176 is defective due to at least one (a) a defect of at least one of the main and monitoring microcomputers 120, 122, (b) a defect of the sensing device 60, namely, at least one of the pedal stroke and force sensors 62, 64, 66, 68, and (c) a defect of at least one of the batteries 20, 22. The rear-brake motor control device 178 is defective due to at least one of the defects indicated at (a) and (b). Since the two batteries 20, 22 are both connected to the rear brake control device 178, a defect of one of the batteries 20, 22 will not cause a defect of the rear-brake motor control device 178.

Referring first to FIGS. 8–10, there will be described cases where the brake control system 170 is defective with at least one of the central and motor control devices 172, 174, 176, 178 being defective.

FIG. 8 indicates the cases where only one of the control devices 172, 174, 176, 178 is defective.

When the central control device 172 (indicated as "CENTRAL ECU" in FIGS. 8–10) is defective, the motor control devices 174, 176, 178 calculate the desired braking force on the basis of the output signals of the pedal stroke and force sensors 62, 64, 66, 68, and controls the motors 32, 34, 36, 38 to operate the electrically operated brakes 12, 14, 16, 18 so as to establish the normal vehicle deceleration value or normal braking effect, as in the normal condition of the braking system, that is, as if the central control device 172 were normal.

There will next be described the cases where one of the motor control devices 174, 176, 178 is defective. The front-left-brake motor control device 174 is defective due to at least one of the defects (a) and (c) indicated above. In this case, the electrically operated brake 12 for the front left wheel 24 is not operated, and the operation of the brake 18 for the rear right wheel 30 located diagonally with respect to the front left wheel 24 is inhibited, while the brakes 14, 16 for the diagonally located front right wheel 26 and the rear left wheel 28 are operated in the normal manner. That is, the diagonal control of the brakes 14, 16 (motors 36, 38) is effected, so as to establish a maximum vehicle deceleration value of 0.5 G, which is 50% of the normal total vehicle braking effect. The above description applies to the case where the front-right-brake motor control device 176 is defective.

The rear-brake motor control device 178 is defective due to the defect (a) indicated above, for example. In this case, the electrically operated brakes 16, 18 are not operated, while the front-brake motor control devices 174, 176 are operated in the normal manner to operate the brakes 12, 14 for braking the front left and right wheels 24, 26. Namely, "2-front-wheel control" of the brakes 12, 14 (motors 32, 34) is effected so as to establish a maximum vehicle deceleration value of 0.7 G, which is 70% of the normal total vehicle braking effect.

Reference is now made to FIG. 9 indicating the cases where two of the four motor control devices 172, 174, 176, 178 are defective.

There will be described the case where the central control device 172 and one of the motor control devices 174, 176, 178 are defective. Although the central control device 172 is defective in this case, the two normal motor control devices are able to calculate the desired braking forces on the basis of the output signals of the pedal stroke and force sensors 62–68, and operate the corresponding brakes. Therefore, the bakes are operated in the same manner as in the case where one of the motor control devices 174, 76, 178 is defective. However, the rear-brake motor control device 178 is defective due to at least one of the defects (a) and (b).

There will be described the cases where the central control device 172 is normal while two of the motor control devices 174, 176, 178 are defective. Where the front-left-brake and front-right-brake motor control devices 174, 176 are defective due to at least one of the defects (a) and (c), only the rear-brake motor control device 178 is operated to operate the rear brakes 16, 18 for braking the rear wheels 28, 30, while the front brakes 12, 14 are not operated. Namely, the "2-rear-wheel" control of the brakes 16, 18 (motors 36, 38) is effected so as to establish a maximum vehicle deceleration value of 0.3 G, which is 30% of the normal total vehicle braking effect.

Where the front left motor control device 174 is defective due to at least one of the defects (a) and (c), for instance, while the rear-brake motor control device 178 is defective due to the defect (a), for instance, only the front-right-brake motor control device 176 is operated to operate only the brake 14 for the front right wheel 14 in the normal manner. Namely, the 1-wheel control" of the brake 14 (motor 34) is effected to as to establish a maximum vehicle deceleration value of 0.35 G, which is 35% of the normal total vehicle braking effect. The above description applies to the case where the front-right-brake motor control device 176 and the rear-brake motor control device 178 are defective.

The cases indicated in FIG. 9 include the case where only the rear-brake motor control device 178 is defective. Although the number of the defective motor control device is equal to one in this case, the two motors 36, 38 of the two rear brakes 16, 18 for the rear left and right wheels 28, 30 are not operable due to the defect of the rear-brake motor control device 178. In comparison with the case (indicated at the sixth row in FIG. 12) wherein the two motors 36, 38 are defective, the above-indicated case wherein the rear-brake motor control device 178 is defective is included in the cases of FIG. 9.

Referring to FIG. 10, there will be described cases where three of the four motor control devices 172, 174, 176, 178 are defective. First, the cases where the central control device 172 and two of the three motor control devices 174, 176, 178 are defective will be described. The operations of the braking system in these cases are similar to those in the cases wherein two of the motor control devices 174, 176, 178 are defective while the central control device 172 is normal. However, the central control device 172 may be defective due to a defect of the pedal stroke and force sensors 62–68.

There will be described the case wherein all of the three motor control devices 174, 176, 178 are defective. In this case, the front brake 1 devices 174, 176 are defective due to at least one of the defects (a) and (c), for example, while the rear-brake motor control device 178 is defective due to the defect (a), for example. In this case, none of the electrically operated brakes 12–18 are operated, and the central control device 172 activates the alarm light and buzzer to inform the vehicle operator that the vehicle drive power source will be turned off to stop the vehicle and that the brake control system 170 is defective. The cases indicated in FIG. 10 include the case where the central control device 172 is normal while the rear-brake motor control device 178 and one of the front-brake motor control devices 174, 176 are defective. Although the number of the defective motor control devices is equal to two in this case, the two motors 36, 38 of the two rear brakes 16, 18 for the rear left and right wheels 28, 30 are not operable due to the defect of the rear-brake motor control device 178. In comparison with the case (indicated at the tenth row in FIG. 12) wherein the two motors 36, 38 are defective, the above-indicated case wherein the rear-brake motor control device 178 and one of the front-brake motor control devices 174, 176 are defective is included in the cases of FIG. 10.

Referring next to FIGS. 11 and 12, there will be described the cases wherein at least one of the four electrically operated brakes 12, 14, 16, 18 is defective. Typically, each brake 12, 14, 16, 18 is defective when the corresponding motor 32, 34, 36, 38 is defective. The defect of each brake is indicated in FIGS. 11 and 12 and will be described, as the defect of the corresponding motor. The operations of the braking system in the cases where only one of the motors 32–38 is defective as indicated in FIG. 11 are similar to those in the cases of FIG. 4 in the first embodiment where one of the motor control devices 52, 54, 56, 58 is defective while the central control device 50 is normal.

The operations of the braking system in the cases where two of the motors 32, 34, 36, 38 are defective as indicated in FIG. 12 are similar to those in the cases of FIG. 5 in the first embodiment where two of the motor control devices 52, 54, 56, 58 are defective. In the case (indicated at the second row in FIG. 12) where the motors 32, 36 of the brakes 12, 16 for the front and rear left wheels 24, 28 are defective, and in the case (indicated at fifth row in FIG. 12) where the motors 34, 38 of the brakes 14, 18 for the front and rear right wheels 26, 30, the operation of the rear brake 18, 16 whose motor 38, 36 is normal is inhibited as in the corresponding cases in FIG. 5, but the braking force to be produced by the front brake 12, 14 whose motor 32, 34 is normal is not made smaller than in the normal condition of the braking system, namely, this front brake 12, 14 is operated so as to establish a maximum vehicle deceleration value of 0.35 G, Which is 35 of the normal total vehicle braking effect.

The operations of the braking system in the cases where three of the four motors 32–38 are defective as indicated at the seventh through tenth rows in FIG. 12 are similar to those in the cases (indicated at the seventh through tenth rows in FIG. 6) wherein three of the motor control devices 52–58 are defective. In the cases indicated at the ninth and tenth rows in FIG. 12 wherein one of the motors 32, 34 of the brakes 12, 14 for the front left and right wheels 24, 26 is normal, however, the braking force to be produced by the front brake 12, 14 whose motor 32, 34 is normal is not made smaller than in the normal condition of the braking system, namely, this front brake 12, 14 is operated so as to establish a maximum vehicle deceleration value of 0.35 G, which is 35% of the normal total vehicle braking effect.

Emergency control programs for controlling the brakes 12–18 as described above by reference to FIGS. 8–12 are stored in the ROM of the main microcomputer 80 of the central control device 172 and the ROMs of the main microcomputers 120, 180 of the motor control devices 174, 176, 178. When the central control device 172 is normal, the above-described operations of the braking system are implemented by the central control device 172 according to the emergency control programs stored therein. When the central control device 172 is defective, the operations are implemented by the normal motor control device or devices according to the emergency control programs stored therein and on the basis of abnormality information obtained through the CANs 102, 104, 106, 204. Where the central control device 172 is defective while the front-left-brake and front-right-brake brake motor control devices 174, 176 are both normally operable to control the front brakes 12, 14, those normal front-brake motor control devices 174, 176 effect serial data communication with each other to determine the same desired braking force for even distribution of the braking forces to the front left and right wheels 12, 14.

Referring to FIGS. 13 and 14, there will be described cases where there are combinations of a defect of the control devices 172, 174, 176, 178 and a defect of the electrically operated brakes 12, 14, 16, 18, which defects exist concurrently. These cases are classified into two groups: cases where the rear-brake motor control device 178 is defective; and cases where the rear-brake motor control device 178 are normal. First, the cases where the rear-brake motor control device 178 is defective will be described, by reference to FIG. 13 which shows: one case where there exists only one defect associated with the rear wheels 28, 30: two cases where there exist two defects one of which is associated with the front left or right 24, 26, and the other of which is associated with the rear wheels 28, 30; and one case where there exist three defects associated with the front left wheel 24, the front right wheel 26 and the rear wheels 28, 30, respectively.

In the case indicated at the first row in FIG. 13, at least one of the rear motors 36, 38, as well as the rear-brake motor control device 178, is defective, but the front-left-brake and front-right brake motor control devices 174, 176 and the corresponding rear motors 32, 34 are normal. In this case, the front-2-wheel control of the front motors 32, 34 is effected to operate the front brakes 12, 14 in the normal manner, so as to establish a maximum vehicle deceleration value of 0.7 G, which is 70% of the normal total vehicle braking effect.

In the case indicated at the second row in FIG. 13, at least one of the front-right-brake motor control device 176 and the corresponding motor 34 for the front right wheel 26, as well as the rear-brake motor control device 178, is defective, and at least one of the motors 34, 36, 38 is defective. In this case, the 1-wheel control of the front-left motor 32 is effected to operate the front left brake 12 in the normal manner, so as to establish a maximum vehicle deceleration value of 0.35 G, which is 35% of the normal total vehicle braking effect. In the case indicated at the third row in FIG. 13, at least one of the front-left-brake motor control device 174 and the corresponding motor 32 for the front left wheel 24, as well as the rear-brake motor control device 178, is defective, and at least one of the motors 32, 36, 38 is defective. In this case, the 1-wheel control of the front right motor 34 is effected to operate the front right brake 12 in the normal manner, so as to establish a maximum vehicle deceleration value of 0.35 G, as in the above case.

In the case indicated at the fourth row in FIG. 13, at least one of the front-left-brake motor control device 174 and the corresponding front motor 32 for the front left wheel 24, and at least one of the front-right-brake motor control device 176 and the corresponding front motor 34 for the front right wheel 26, as well as the rear-brake motor control device 178, are defective, and at least one of the motors 32, 34, 36, 38 is defective. In this case, the vehicle drive power source is turned off.

Referring next to FIG. 14, there will be described the cases where there exist a defect of at least one of the brakes 12–18 and a defect of at least one of the front-brake motor control devices 174, 176 while the rear-brake motor control device 178 is normal.

In the case indicated at the first row in FIG. 14, the right-wheel-brake motor control device 176 and the corresponding front motor 34 for the front right wheel 26 are concurrently defective. In this case, the operation of the brake 16 for the rear left wheel 28 is inhibited, and the diagonal control of the motors 32, 38 is effected to operate the front left brake 12 and the rear right brake 18, so as to establish a maximum vehicle deceleration value of 0.5 G, which is 50% of the normal total vehicle braking effect. In the case indicated at the second row in FIG. 14, the front left motor control device 174 and the corresponding front motor 32 for the front left wheel 24 are concurrently defective, the operation of the brake 18 for the rear right wheel 30 is inhibited, and the diagonal control of the motors 34, 36 is effected to operate the front right brake 14 and the rear left brake 16, so as to establish a maximum vehicle deceleration value of 0.5 G, as in the above case.

In the case indicated at the third row in FIG. 14, the front-right-brake motor control device 176 for the front right wheel 26 and the motor 36 for the rear left wheel 28 are defective. In this case, the front right brake 14 and the rear left brake 16 are not operated, and the diagonal control of the motors 32, 38 is effected to operate the front left brake 12 and the rear right brake 18 so as to establish a maximum vehicle deceleration value of 0.5 G, which is 50% of the normal total vehicle braking effect. In the case indicated at the seventh row in FIG. 14, the front-left-brake motor control device 174 for the front left wheel 24 and the motor 38 for the rear right wheel 30 are defective. In this case, the diagonal control of the motors 34, 36 is effected to operate the front right brake 14 and the rear left wheel 16 so as to establish a maximum vehicle deceleration value of 0.5 G as in the above case.

In the case indicated in the fourth row in FIG. 14, the front-right motor control device 176 for the front right wheel 26 and the motor 38 for the rear right wheel 30 are defective. In this case, the operation of the brake 16 for the rear left wheel 28 is inhibited, and the 1-wheel control of the motor 32 is effected to operate the brake 12 for the front left wheel 24, so as to establish a maximum vehicle deceleration value of 0.35 G, which is 35 of the normal total vehicle braking effect. In the case indicated at the sixth row in FIG. 14, the front-left-brake motor control device 174 for the front left wheel 24 and the motor 36 for the rear left wheel 28 are defective. In this case, the operation of the brake 18 for the rear right wheel 30 is inhibited, and the 1-wheel control of the motor 34 is effected to operate the brake 14 for the front right wheel 26, so as to establish a maximum vehicle deceleration value of 0.35 G, as in the above case.

In the case indicated at the fifth row in FIG. 14, the motors 36, 38 for the rear wheels 28, 30 are normal, and at least one of the front-brake motor control devices 174, 176 for the front wheels 24, 26 and at least one of the motors 32, 34 for the front wheels 24, 26 are defective. Further, at least one of the front-left motor 32 and the corresponding front-left-brake motor control device 174 and at least one of the front-right motor 34 and the corresponding front-right-brake motor control device 176 are defective. In this case, the 2-rear-wheel control of the motors 36, 38 is effected to operate the brakes 16, 18 for the rear left and right wheels 28, 30, so as to establish a maximum vehicle deceleration value of 0.3 G, which is 30% of the normal total vehicle braking effect.

Finally, the cases where three defects associated with the front left wheel 24, the front right wheel 26 and the rear wheels 28, 30 while the rear-brake motor control device 178 is normal will be described. In the case indicated at the eighth row in FIG. 14, the front-right-brake motor control device 176 for the front right wheel 26 and the motors 36, 38 of the rear left and right wheels 28, 30 are defective. In this case, the 1-wheel control of the motor 32 is effected to operate the brake 12 for the front left wheel 24, so as to establish a maximum vehicle deceleration value of 0.35 G, which is 35% of the normal total vehicle braking effect. In the case indicated at the ninth row in FIG. 14, the front-left-brake motor control device 174 for the front left wheel 24 and the motors 36, 38 of the rear wheels 28, 30 are defective. In this case, the 1-wheel control of the motor 34 is effected to operate the brake 14 for the front right wheel 26, so as to establish a maximum vehicle deceleration value of 0.35 G, as in the above case.

In the case indicated at the tenth row in FIG. 14, at least one of the front-brake motor control devices 174, 176 for the front left and right wheels 24, 26 and the motor 38 for the rear right wheel 30 are defective. Further, at least one of the front-left-brake motor control device 174 and the corresponding motor 32, and at least one of the front-right-brake motor control device 176 and the corresponding motor 34 are defective. In this case, the vehicle drive power source is turned off to stop the vehicle, although the operation of the brake 16 for the rear left wheel 28 is possible to establish a maximum vehicle deceleration value of 0.15 G which is 15% of the normal total vehicle braking effect. In the case indicated at the eleventh row in FIG. 14, at least one of the front-brake motor control devices 174, 176 for the front left and right wheels 24, 26 and the motor 36 for the rear left wheel 28 are defective. Further, at least one of the front-left-brake motor control device 174 and the corresponding motor 32, and at least one of the front-right-brake motor control device 176 and the corresponding motor 34 are defective. In this case, too, the vehicle drive power source is turned off to stop the vehicle.

The emergency operations of the braking system which have been described above by reference to FIGS. 13 and 14 are implemented according to emergency control programs stored in the ROM of the main microcomputer 80 of the central control device 172 or according to the emergency control programs stored in the ROM of the main microcomputer 120, 180 of the motor control device or devices 174, 176, 178, when there exists at least one defect associated with the electrically controlled brake or brakes 12–18 and at least one defect associated with the motor control device or devices 174, 176, 178. While the central control device 172 is normal, this control device 172 controls the motors 32–38 according to the emergency control programs stored therein. While the central control device is defective, the normal one or ones of the motor control devices 174, 176, 178 controls or control the motors according to the emergency control programs stored therein and on the basis of abnormality information obtained through the CANs 102, 104, 106, 204. Each normal motor control device 174, 176, 178 calculates the desired braking force on the basis of the out signals of the sensing device 160, and controls the motors 32–38 according to the calculated desired braking force.

It will be understood from the foregoing description of the second embodiment that the rear-brake motor control device 178 has three control portions, namely, a common rear-brake control portion, an independent rear-brake control portion, and a one-rear-brake control portion. The common rear-brake control portion is arranged to determine a common desired braking force for the two rear brakes 16, 18, on the basis of the output signals of the pedal stroke and force sensors 64 and 68, and control the rear brakes 16, 18 according to the calculated common desired braking force, while the braking system is normal, or while the brakes 12, 14 for the front left and right wheels 24, 26 are not operable due to their defects. The independent rear-brake control portion is arranged to be operable when one of the front brakes 12, 14 is defective, to operate one of the rear brakes 16, 18 while inhibiting an operation of the other rear brake. The one-rear-brake control portion is arranged to be operable when one of the rear brakes 16, 18 is defective, to operate the other rear brake.

In the cases indicated at the first, second, fourth and sixth rows in FIG. 14, the rear-brake motor control device 178 is normal, and there exist a defect associated with at least one of the front-brake motor control devices 174, 176 and a defect associated with at least one of the electrically operated brakes 12, 14, 16, 18, and one of the front brakes 12, 14 is not operable due to a defect of at least one of the corresponding front-brake motor control device the motor. In these cases, the operation of the rear brake 16, 18 for the rear wheel 28, 30 located diagonally with respect to the front wheel 24, 26 whose brake 12, 14 is not operable is inhibited, though that operation is possible. However, the above-indicated rear brake 16, 18 may be operated to produce a predetermined braking force provided the operation of this rear brake does not deteriorate or does not have a risk of deteriorating the running stability of the vehicle, for instance, where the vehicle is running straight or at a sufficiently low speed. The predetermined braking force produced by the above-indicated rear brake may be a predetermined percentage of the nominal value corresponding to the vehicle deceleration value of 0.35 G, or may be equal to the nominal value. This modified arrangement may apply to the rear brake located diagonally with respect to the defective front brake in the "restricted-1-wheel control", "1-wheel control" and "diagonal control" in the first and second embodiments described above, wherein one of the front brakes is not operable due to a defect associated therewith.

In the illustrated embodiments, the two microcomputers provided in the central control device 50, 172 have different functions. Namely, one of the microcomputers is the main microcomputer capable of performing arithmetic operations such as an operation to calculate the desired braking force for each electrically operated brake, while the other microcomputer is a monitoring microcomputer capable of monitoring the main microcomputer for any abnormality or defect. However, the central control device may use two microcomputers having the same function. For instance, two batteries and two pairs of pedal stroke and force sensors are all connected to each of these two identical microcomputers. Alternatively, the two pairs of pedal stroke and force sensor may be connected to the respective two microcomputers.

Where the two microcomputers of the central control device have the same function, these two microcomputers are both capable of calculating the desired braking force and diagnosing each other. While the two microcomputers are both normal, at least one of the two microcomputers supplies data representative of the calculated desired braking force to the other control devices. In this respect, a predetermined one of the two microcomputers may be assigned to supply the calculated desired braking force data to the motor control devices, or alternatively, the two microcomputers are adapted to obtain an average of their calculated desired braking force values, and supply data indicative of this average to the motor control devices. Even if one of the two microcomputers is defective, the other microcomputer is able to supply data representative of its calculated desired braking force to the motor control devices. If both of the two microcomputers are defective, the braking system is controlled as described above with respect to a defect of the central control device 50.

While the illustrated embodiments are adapted to use a watching dog pulse for the two microcomputers to diagnose each other, the two microcomputers may be arranged to compare their calculated desired braking force values with each other, and determine that one of the two microcomputers is defective if the two calculated desired braking force values are not equal to each other. In this case, a suitable analysis of the calculated desired braking force values makes it possible to determine which one of the two microcomputers is defective. For instance, if the desired braking force calculated by one of the two microcomputers does not change with a change in the output signals of the pedal stroke and force sensors, this one microcomputer may be considered to be defective.

The two microcomputers of each motor control device as a peripheral control device may have the same function. In this case, each of the two microcomputers calculates the desired braking force and diagnose the other microcomputer. Where a single rear-brake motor control device is used for the two rear brakes, this motor control device may have two microcomputers having the same function, one of which is assigned to control one of the rear brake and the other of which is assigned to control the other rear brake. In any case, when one of the two microcomputers is defective, the other microcomputer may be turned off or kept operated. If one of the two microcomputers of the rear-brake motor control device for the two rear wheels becomes defective, the other or normal microcomputer may be operated to control the rear brake which has been controlled by the defective microcomputer.

In the illustrated embodiments wherein the central control device 50, 172 include the main and monitoring microcomputers 80, 82, the central control device 50, 172 is determined to be defective when at least one of these main and monitoring microcomputers 80, 82 is defective. However, this defect of one of the two microcomputers may be otherwise treated or handled. For instance, where the monitoring microcomputer 82 becomes defective, the normal main microcomputer 80 continues to supply its calculated desired braking force data to the motor control devices 52–58, 174–178, and may optionally activate an alarm indicator such as an alarm light and/or an alarm buzzer, for informing the vehicle operator that the monitoring microcomputer 82 is defective.

In the illustrated embodiments, the monitoring microcomputer 82, 122, 182 is adapted to apply the watching dog pulse to the main microcomputer 80, 120, 180 at a predetermined time interval, irrespective of the condition of execution of the emergency control programs by the main microcomputer 80, 120, 180. However, the main microcomputer 800, 120, 180 may be adapted to apply the watching dog pulse to the monitoring microcomputer 82, 122, 182 during interruption of execution of the emergency control programs at specific points of time, for the purpose of diagnosing the main and monitoring microcomputers.

Where the central control device is defective and a certain motor control device is defective due to a defect of the pedal stroke and force sensors 62, 64, 66, 68, this defective motor control device may receive from the other normal motor control devices the output signals of the normal pair of pedal stroke and force sensors through the CAN in the normal state, so that the normal motor control devices diagnose the sensors on the basis of the four output signals. Where only one of the pedal stroke and force sensors connected to a given motor control device is defective, this motor control device may calculate the desired braking force on the basis of the output signal of the other normal sensor, or on the basis of the two output signals of the normal pair of pedal stroke and force sensors received from the normal motor control device. Where the motor control devices effect serial communication with each other, the defective one of the two sensors of one pair may be detected on the basis of the two output signals of the normal pair of sensors, and the desired braking force may be calculated on the basis of the output signal of the normal one of the two sensors when the other sensor is defective.

In the first embodiment, one of the two pairs of pedal stroke and force sensors 62, 64, 66, 68 which are adapted to detect two different kinds of physical quantities is connected to a set of motor control devices 52, 58 corresponding to the front left and rear right wheels 24, 30 located diagonally with respect to each other, while the other pair is connected to another set of motor control devices 54, 56 corresponding to the diagonally located vehicle wheels 26, 28. However, it is possible connect one pair of sensor to the two front-brake motor control devices 52, 54, and connect the other pair to the two rear-brake motor control devices 56, 58. It is also possible to connect one of the two batteries 20, 22 to the front-brake motor control devices 52, 54 and connect the other battery to the rear-brake motor control devices 56, 58.

It will be understood that the principle of the present invention is equally applicable to an electric control system other than the brake control system, for an automotive vehicle.

It is to be understood that the present invention may be embodied with various other changes, modifications and improvements, such as those described in the SUMMARY OF THE INVENTION, which may occur to those skilled in the art.

What is claimed is:

1. An electric control system for electrically controlling an actuator device of an automotive vehicle, including:
   a peripheral control device operable to electrically control said actuator device;
   a central control device connected to said peripheral control device;
   an input device connected to both of said central control device and said peripheral control device;
   said central control device and said peripheral control device cooperating with each other to control said actuator device on the basis of an output of said input device; and
   at least two power source devices which are mutually independently connected to said central control device.

2. An electric control system for an automotive vehicle according to claim 1, wherein said input device includes a sensor operable to generate an output signal representative of a physical quantity.

3. An electric control system for an automotive vehicle according to claim 2, wherein said sensor is operable to detect at least one of an operating force and an operating stroke of a manually operated member which is operable by an operator.

4. An electric control system for an automotive vehicle according to claim 1, wherein said actuator device includes a plurality of actuators, and said peripheral control device includes a plurality of peripheral control devices connected to said plurality of actuators, respectively, and wherein said input device is connected to at least one of said plurality of peripheral control devices.

5. An electric control system for an automotive vehicle according to claim 4, wherein said input device is connected to at least two of said plurality of peripheral control devices.

6. An electric control system for an automotive vehicle according to claim 5, wherein said input device is connected to all of said plurality of peripheral control devices.

7. An electric control system, for an automotive vehicle according to claim 1, wherein said input device includes a plurality of input devices whose output signals represent different kinds of information all of said plurality of input devices being connected to said central control device and said peripheral control device.

8. An electric control system for an automotive vehicle according to claim 1, wherein said peripheral control device consists of a plurality of peripheral control devices, and said input device includes a plurality of input devices whose output signals represent a same kind of information, all of said input devices being connected to said central control device, one of said plurality of input devices being connected to at least one of said plurality of peripheral control devices while another of said plurality of input devices being connected to another of said plurality of peripheral control devices.

9. An electric control system for an automotive vehicle according to claim 1, wherein said actuator device includes a plurality of actuators, and said peripheral control device includes a plurality of peripheral control devices connected to said plurality of actuators, respectively, at least one of at least two power source devices being connected to at least one of said peripheral control devices while at least another of said at least two power source devices being connected to at least another of said peripheral control devices.

10. An electric control system for an automotive vehicle according to claim 1, wherein said at least two power source devices are mutually independently connected to said input device.

11. An electric control system for an automotive vehicle according to claim 1, wherein said central control device includes a main computer for controlling said actuator device, and a monitoring computer for diagnosing said main computer, each of said at least two power source devices being connected to both of said main and monitoring computers.

12. An electric control system for an automotive vehicle according to claim 1, wherein said central control device includes a plurality of computers capable of performing a same function, each of said at least two power source devices being connected to said plurality of computers.

13. An electric control system for an automotive vehicle according to claim 1, wherein said actuator device includes four actuators in the form of four brakes constructed to brake a front left wheel, a front right wheel, a rear left wheel and a rear right wheel of the automotive vehicle, respectively, and said peripheral control device includes four brake control devices operable to control said four brakes, respectively, at least one of said at least two power source devices being connected to the two brake control devices corresponding to said front left and rear right wheels which are located diagonally with respect to each other in the automotive vehicle, at least another of said at least two power source devices being connected to the two other brake control devices corresponding to said front right and rear left wheels which are located diagonally with respect to each other in the automotive vehicle.

14. An electric control system for electrically controlling four brakes respectively constructed to brake a front left wheel, a front right wheel, a rear left wheel and a rear right wheel of an automotive vehicle, including:

four brake control devices respectively operable to electrically control said four brakes, respectively, said four brake control devices including two brake control devices for controlling the respective two brakes for braking said front left and right wheels;

said two brake control devices being connected to each other;

a central control device connected to said four brake control devices;

an input device connected to both of said central control device and said four brake control devices; and said central control device and said four brake control devices cooperating with each other to control said four brakes on the basis of an output of said input device, wherein one of said two brake control devices controls an operation of the other of said two brake control devices when said central control device is defective.

15. An electric control system for an automotive vehicle according to claim 14, wherein each of said at least two brake control devices connected to each other is connected to said central control device.

16. An electric control system for an automotive vehicle according to claim 14, wherein said input device is connected to each of said two brake control devices.

17. An electric control system for electrically controlling two rear-wheel brakes and two front-wheel brakes which are respectively constructed to brake a rear left wheel, a rear right wheel, a front left wheel and a front right wheel of an automotive vehicle, including:

a common rear-brake control device operable to control said two rear-wheel brakes, respectively;

two front-brake control devices operable to control said two front-wheel brakes, respectively;

a central control device connected to said common rear-brake control device and said two front-brake, control devices; and an input device connected to said central control device, said common rear-brake control device and said two front-brake control devices, said central control device, said common rear-brake control device and said two front-brake control devices cooperating with each other to control said two rear-wheel brakes and said two front-wheel brakes on the basis of an output of said input device.

18. An electric control system for an automotive vehicle according to claim 17, wherein said rear-brake control device includes an independent rear-brake control portion operable to control said two rear-wheel brakes in respective different manners.

19. An electric control system for an automotive vehicle according to claim 17, wherein said rear-brake control device includes a common rear-brake control portion operable to control said two rear-wheel brakes in a same manner.

20. An electric control system for an automotive vehicle according to claim 17, wherein said rear-brake control device includes a one-rear-brake control portion operable to operate one of said two rear-wheel brakes when the other of said two rear-wheel brakes is defective.

21. An electric control system for electrically controlling an actuator device of an automotive vehicle, including:

a peripheral control device operable to electrically control said actuator device;

an input device:

a central control device connected to said peripheral control device and operable such that said central control device and said peripheral control device cooperate with each other to control said actuator device on the basis of an output of said input device; and at least two power source devices which are mutually independently connected to said central control device.

* * * * *